United States Patent
Maimone

(10) Patent No.: US 10,274,731 B2
(45) Date of Patent: Apr. 30, 2019

(54) OPTICAL SEE-THROUGH NEAR-EYE DISPLAY USING POINT LIGHT SOURCE BACKLIGHT

(71) Applicant: The University of North Carolina at Chapel Hill, Chapel Hill, NC (US)

(72) Inventor: Andrew Stephen Maimone, Durham, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 166 days.

(21) Appl. No.: 15/105,903
(22) PCT Filed: Dec. 19, 2014
(86) PCT No.: PCT/US2014/071556
§ 371 (c)(1),
(2) Date: Jun. 17, 2016
(87) PCT Pub. No.: WO2015/095737
PCT Pub. Date: Jun. 25, 2015

(65) Prior Publication Data
US 2016/0320620 A1 Nov. 3, 2016

Related U.S. Application Data

(60) Provisional application No. 61/918,385, filed on Dec. 19, 2013.

(51) Int. Cl.
*G02B 27/01* (2006.01)
*G06F 3/01* (2006.01)
*G09G 3/00* (2006.01)
*G02B 27/00* (2006.01)
*F21V 8/00* (2006.01)
(Continued)

(52) U.S. Cl.
CPC ....... *G02B 27/0172* (2013.01); *G02B 6/0008* (2013.01); *G02B 6/0043* (2013.01);
(Continued)

(58) Field of Classification Search
CPC ............ G02B 27/0172; G02B 27/0093; G02B 27/0179
(Continued)

(56) References Cited

U.S. PATENT DOCUMENTS

| 5,537,144 A | 7/1996 | Faris |
| 6,483,484 B1 | 11/2002 | Yamazaki et al. |

(Continued)

FOREIGN PATENT DOCUMENTS

| JP | 2011-145607 A | 7/2011 |
| KR | 10-2008-0103407 A | 11/2008 |

(Continued)

OTHER PUBLICATIONS

Notice of Allowance and Fee(s) Due, Examiner Initiated Interview Summary, and After Final Consideration Program Decision for U.S. Appl. No. 15/423,198 (dated Feb. 8, 2018).

(Continued)

*Primary Examiner* — Carolyn R Edwards
(74) *Attorney, Agent, or Firm* — Jenkins, Wilson, Taylor & Hunt P.A.

(57) ABSTRACT

According to one aspect, the subject matter described herein includes a near-eye optical see-through display. The display includes a backlight layer including a plurality of point light sources. The display further includes a spatial light modulator (SLM) layer for modulating light from the point light sources. The spatial light modulator is located in the optical path between the point light sources and a user's eye. The spatial light modulator layer includes pixels that are controllable to modulate light from the point light sources such that the light that impacts the user's eye has a desired intensity and color to display a synthetic image. At least a portion of the backlight layer and the spatial light modulator layer are optically transparent to allow a user to view a real scene through the spatial light modulator layer and the backlight layer such that the synthetic image appears to be overlaid on a view of the real scene. Each pixel in the spatial light modulator layer modulates only a portion of the light emanating from the point light sources such that the synthetic image appears to be in focus to the user's eye.

19 Claims, 19 Drawing Sheets

(51) Int. Cl.
| | |
|---|---|
| G02B 26/04 | (2006.01) |
| G06T 19/00 | (2011.01) |
| H04N 9/31 | (2006.01) |
| G09G 3/34 | (2006.01) |
| G09G 3/36 | (2006.01) |

(52) U.S. Cl.
CPC ......... *G02B 26/04* (2013.01); *G02B 27/0093* (2013.01); *G02B 27/0179* (2013.01); *G06F 3/011* (2013.01); *G06T 19/006* (2013.01); *G09G 3/002* (2013.01); *G09G 3/3406* (2013.01); *G09G 3/3611* (2013.01); *H04N 9/3182* (2013.01); *G02B 2027/0123* (2013.01); *G02B 2027/0132* (2013.01); *G02B 2027/0174* (2013.01); *G02B 2027/0178* (2013.01); *G02B 2027/0187* (2013.01)

(58) Field of Classification Search
USPC .......................................................... 345/5–9
See application file for complete search history.

(56) References Cited

U.S. PATENT DOCUMENTS

| | | | |
|---|---|---|---|
| 6,977,705 | B1 | 12/2005 | Chiang et al. |
| 7,639,208 | B1* | 12/2009 | Ha ..................... G02B 27/0172 345/204 |
| 7,800,708 | B2* | 9/2010 | Brott .................... G02B 6/0061 349/61 |
| 9,360,616 | B2* | 6/2016 | Yang .................... G02B 6/0061 |
| 9,858,721 | B2 | 1/2018 | Maimone et al. |
| 9,983,412 | B1 | 5/2018 | Fuchs et al. |
| 2003/0179464 | A1 | 9/2003 | Amanai |
| 2004/0108971 | A1 | 6/2004 | Waldern et al. |
| 2004/0265150 | A1 | 12/2004 | McElfresh et al. |
| 2005/0117016 | A1* | 6/2005 | Surman .............. G02B 27/2214 348/51 |
| 2007/0285346 | A1 | 12/2007 | Li |
| 2008/0088937 | A1 | 4/2008 | Tang |
| 2008/0117289 | A1 | 5/2008 | Schowengerdt et al. |
| 2010/0118123 | A1 | 5/2010 | Freedman et al. |
| 2011/0242441 | A1* | 10/2011 | Minami ............... G02B 5/0215 349/15 |
| 2012/0068913 | A1 | 3/2012 | Bar-Zeev et al. |
| 2012/0119978 | A1* | 5/2012 | Border .............. G02B 27/0172 345/8 |
| 2012/0120498 | A1 | 5/2012 | Harrison et al. |
| 2012/0206452 | A1 | 8/2012 | Geisner et al. |
| 2012/0235887 | A1* | 9/2012 | Border .............. G02B 27/0093 345/8 |
| 2013/0083173 | A1 | 4/2013 | Geisner et al. |
| 2013/0162505 | A1* | 6/2013 | Crocco .................... G09G 5/00 345/7 |
| 2013/0222369 | A1 | 8/2013 | Huston et al. |
| 2013/0286053 | A1 | 10/2013 | Fleck et al. |
| 2014/0168783 | A1* | 6/2014 | Luebke ................ G02B 3/0006 359/630 |
| 2015/0243094 | A1 | 8/2015 | Schowengerdt et al. |
| 2015/0243099 | A1 | 8/2015 | Schowengerdt |
| 2015/0248046 | A1 | 9/2015 | Schowengerdt |
| 2015/0363978 | A1 | 12/2015 | Maimone et al. |

FOREIGN PATENT DOCUMENTS

| | | |
|---|---|---|
| KR | 10-2009-0052169 A | 5/2009 |
| WO | WO 2014/011266 A2 | 1/2014 |
| WO | WO 2014/113455 A1 | 7/2014 |

OTHER PUBLICATIONS

Commonly-assigned, co-pending U.S. Appl. No. 62/348,838 for "Methods, Systems, and Computer Readable Media for Utilizing Occlusion Masks for Near-Eye Augmented Reality (AR) Displays," (Unpublished, filed Jun. 10, 2016).

Yamaguchi et al., "See-through integral imaging display with background occlusion capability," Applied Optics Research Article, vol. 55, No. 3., pp. 1-6 (Jan. 2016).

Notification of Transmittal of the Internationnal Search Report and the Written Opinion of the International Searching Authority, or the Declaration of PCT International Patent Application No. PCT/US2014/071556 (dated Jun. 25, 2015).

Notification of Transmittal of the International Search Report and the Written Opinion of the International Searching Authority, or the Declaration for International Application No. PCT/US2014/011651 (dated May 13, 2014).

Gao et al., "Optical See-Through Head-Mounted Display with Occlusion Capability." SPIE Defense, Security and Sensing. International Society for Optics and Photonics, pp. 1-9 (2013).

Maimone et al., "General-Purpose Telepresence with Head-Worn Optical See-Through Displays and Projector-Based Lighting," To appear in: IEEE Virtual Reality, (Mar. 2013).

Wetzstein et al., "Tensor Displays: Compressive Light Field Syntheses using Multilayer Displays with Directional Backlighting," ACM Transactions on Graphics (Proceedings of SIGGRAPH), vol. 31, Issue 4, pp. 1-11, (2012).

Travis et al., "Wedge Optics in Flat Panel Displays," Proceedings of the IEEE, vol. 101, Issue 1, pp. 45-60, (2012).

Hu et al., "Design of an Optical See-Through Multi-Focal-Plane Stereoscopic 3D Display Using Freeform Prisms," Frontiers in Optics Conference, Paper FTh1F.2, Optical Society of America, (2012).

Gao et al., "Occlusion Capable Optical See-Through Head-Mounted Display Using Freeform Optics," IEEE International Symposium on Mixed and Augmented Reality (ISMAR) 2012, pp. 281-282 (Nov. 2012).

Maimone et al., "Real-Time Volumetric 3D Capture of Room-Sized Scenes for Telepresence," 3DTV Conference: The True Vision—Capture, Transmission and Display of 3D Video (3DTV-CON), (Oct. 2012).

Berger et al., "Markerless Motion Capture using multiple Color-Depth Sensors," In proceedings of Vision, Modeling, and Visualization, pp. 1-8 (2011).

Wetzstein et al., "Layered 3D: Tomographic Image Synthesis for Attenuation-Based Light Field and High Dynamic Range Displays," ACM Transactions on Graphics, vol. 30, Issue 4, (2011).

Lingley et al., "A Single-Pixel Wireless Contact Lens Display," Journal of Micromechanics and Micro-engineering, vol. 21, Issue 12, p. 125014, (2011).

Lanman et al., "Polarization Fields: Dynamic Light Field Display Using Multi-Layer LCDs," ACM Transactions on Graphics, vol. 30, Issue 6, (2011).

Maimone et al., "A First Look at a Telepresence System with Room-Sized Real-Time 3D Capture and Life-Sized Tracked Display Wall," Artificial Reality and Telexistence (ICAT), 21st International Conference, (Nov. 2011).

Commonly-assigned, co-pending U.S. Appl. No. 61/552,775 for "Methods, Systems, and Computer Readable Media for Reducing Interference Between a Plurality of Structured Light Depth Sensors," (Unpublished, filed Oct. 28, 2011).

Maimone et al., "Encumbrance-Free Telepresence System with Real-Time 3D Capture and Display using Commodity Depth Cameras," 10th IEEE International Symposium on Mixed and Augmented Reality (ISMAR), (Oct. 2011).

Fite-Georgel, "Is There a Reality in Industrial Augmented Reality?" 10th IEEE International Symposium on Mixed and Augmented Reality (ISMAR), pp. 201-210, Science and Technology Proceedings, Switzerland (Oct. 2011).

Cheng et al., "Design of a Wide-Angle, Lightweight Head-Mounted Display Using Free-Form optics Tiling," Optics Letters, vol. 36, Issue 11: pp. 2098-2100, (Jun. 2011).

Lanman et al., "Content-Adaptive Parallax Barriers: Optimizing Dual-Layer 3D Displays using Low-Rank Light Field Factorization," ACM Transactions on Graphics, vol. 29, Issue 6, pp. 163:1-163:10, (2010).

McGuire Jr. et al., "Next-Generation Head-Mounted Display," Proceedings of SPIE 7618, Emerging Liquid Crystal Technologies V, pp. 761804-761804-8, (2010).

(56) References Cited

OTHER PUBLICATIONS

Cakmakci et al., "Design of a Free-Form Single-Element Head-Worn Display," Proceedings of the SPIE 7618, Emerging Liquid Crystal Technologies V, pp. 761803-761803-6, (2010).
Gu Ye et al., "A Practical Multi-Viewer Tabletop Autostereoscopic Display," 9th IEEE International Symposium on Mixed and Augmented Reality (ISMAR), pp. 147-156, (Oct. 2010).
Kroeker et al., "Mainstreaming Augmented Reality," Communications of the ACM, vol. 53, Issue 7, pp. 19-21, (Jul. 2010).
Liu et al., "A Novel Prototype for an Optical See-Through Head-Mounted Display with Addressable Focus Cues," Visualization and Computer Graphics, IEEE Transactions, vol. 16, Issue 3, pp. 381-393, (May-Jun. 2010).
Joshi et al., "Image Deblurring using Inertial Measurement Sensors," in ACM SIGGRAPH 2010 papers, pp. 1-8 (2010).
Lincoln et al., "Animatronic Shader Lamps Avatars," Proceedings of the 2009 8th IEEE International Symposium on Mixed and Augmented Reality, ISMAR, pp. 27-33, Washington, DC, USA. IEEE Computer Society, (2009).
Lincoln et al., "Multi-View Lenticular Display for Group Teleconferencing," Proceedings of the 2nd International Conference on Immersive Telecommunications, IMMERSCOM, pp. 22:1-22:8, ICST, Brussels, Belgium, Belgium ICST (Institute for Computer Sciences, Social-Informatics and Telecommunications Engineering), (2009).
Nashel et al., "Random Hole Display: A Non-Uniform Barrier Autostereoscopic Display," 3DTV Conference: The True Vision—Capture, Transmission and Display of 3D Video, pp. 1-4, (May 2009).
Santos et al., The Daylight Blocking Optical Stereo See-Through HMD, Proceedings of the 2008 Workshop on Immersive Projection Technologies/Emerging Display Technologies, IPT/EDT, ACM, Article 4, pp. 1-4, New York, USA, (2008).
Wang et al., "Optical occlusion in a see-through AR system," International Symposium on Photoelectronic Detection and Imaging: Technology and Applications 2007. International Society for Optics and Photonics, pp. 1-7 (2007).
Zhou et al., "A Novel Optical See-Through Head-Mounted Display with Occlusion and Intensity Matching Support." Technologies for E-Learning and Digital Entertainment. Springer Berlin Heidelberg, pp. 56-62 (2007).
Hagood et al., 35.5I: "Late-News Paper: A Direct-View Mems Display for Mobile Applications," SID Symposium Digest of Technical Papers, vol. 38, Issue 1, pp. 1278-1281, (2007).
Feng et al., "Realization of Multilayer Occlusion between Real and Virtual Scenes in Augmented Reality," in Proceedings of the 10th International Conference on Computer Supported Cooperative Work in Design, pp. 1-5 (May 2006).
Cakmakci et al., "Design of a compact optical see-through head-worn display with mutual occlusion capability," International Society for Optics and Photonics, pp. 1-6 (2005).
Cakmakci et al., "A Compact Optical See-Through Head-Worn Display with Occlusion Support," Proceedings of the 3rd IEEE and ACM International Symposium on Mixed and Augmented Reality, ISMAR, pp. 16-25, Washington, DC, USA, IEEE Computer Society, (2004).
Kiyokawa et al., "An Occlusion-Capable Optical See-Through Head Mount Display for Supporting Co-located Collaboration," Proceedings of the 2nd IEEE/ACM International Symposium on Mixed and Augmented Reality, ISMAR, pp. 133-141, Washington, DC, USA. IEEE Computer Society, (2003).
Kasai et al., "A Practical See-Through Head Mounted Display Using a Holographic Optical Element," Optical Review, vol. 8, Issue 4, pp. 241-244, (2001).
Fuchs et al., "Augmented reality visualization for laparoscopic surgery," Proceedings of the First International Conference on Medical Image Computing and Computer-Assisted Intervention, pp. 934-943. Springer-Verlag, (1998).
Raskar et al., "The Office of the Future: a Unified Approach to Image-Based Modeling and Spatially Immersive Displays," Proceedings of the 25th Annual Conference on Computer Graphics and Interactive Techniques, SIGGRAPH, pp. 179-188, New York, NY, USA. ACM, (1998).
Feiner et al., "A Touring Machine: Prototyping 3D Mobile Augmented Reality Systems for Exploring the Urban Environment," Proceedings of the 1st IEEE International Symposium on Wearable Computers, ISWC, pp. 74-81, Washington, DC, USA, IEEE Computer Society, (1997).
Daly, "Digital Images and Human Vision. Chapter the Visible Differences Predictor: an Algorithm for the Assessment of Image Fidelity," pp. 179-206. MIT Press, Cambridge, MA, USA, (1993).
Neumann et al., "A Vision of Telepresence for Medical Consultations and Other Applications," Proceedings of the Sixth International Symposium on Robotics Research, pp. 565-571, (Oct. 1993).
Feiner et al., "Knowledge-Based Augmented Reality," Communications of the ACM, vol. 36, Issue 7, pp. 53-62, (Jul. 1993).
Caudell et al., "Augmented Reality: an Application of Heads-up Display Technology to Manual Manufacturing Processes," System Sciences, Proceedings of the Twenty-Fifth Hawaii International Conference on, vol. II, pp. 659-669 vol. 2, (Jan. 1992).
Richardson, "Bayesian-Based Iterative Method of Image Restoration," Journal of the Optical Society of America, vol. 62, No. 1, pp. 55-59 (Jan. 1972).
Notice of Allowance and Fee(s) Due for U.S. Appl. No. 14/761,229 (dated Aug. 30, 2017).
Non-Final Office Action for U.S. Appl. No. 15/423,198 (dated May 19, 2017).
Notice of Allowance and Fee(s) Due for U.S. Appl. No. 14/761,229 (dated May 19, 2017).
Non-Final Office3 Action for U.S. Appl. No. 14/761,229 (dated Jan. 27, 2017).
Commonly-assigned, co-pending U.S. Appl. No. 15/423,198 for "Wide Field of View Augmented Reality See Through Head Mountable Display With Distance Accomodation," (Unpublished, filed Feb. 2, 2017).
Lee et al., "Effects of Optical Combiner and IPD Change for Convergence on Near-Field Depth Perception in an Optical See-Through HMD," IEEE Transactions on Visualization and Computer Graphics, vol. 22, No. 5, pp. 1540-1554 (May 2016).
Bharadwaj et al., "Acceleration characteristics of human ocular accommodation," Vision Research, 45, pp. 17-28 (2005).
Sisodia et al., "Design of an advanced helmet mounted display (ahmd)," Defense and Security, International Society for Optics and Photonics, pp. 304-315 (2005).
Phillips et al., "Analysis of accommodative response times using histogram information," American Journal of Optometry & Archives of American Academy of Optometry, 49(5), pp. 389-401 (1972).
Campbell et al., "Dynamics of Accommodation responses of the Human Eye," J. Physiol., 151, pp. 285-295 (1960).
Lippmann, "Photographie—Epreuves reversible. Photographies integrals," Acdemie des sciences, 146, translation included, pp. 446-451 (1908).
"User Interface: This section goes over how Glass prevents information, how users interact with it, and how Glass responds to user interaction," Glass Developers—Google Developers, Google Glass, Creative Commons Attribution 3.0 License, https://web.archive.org/web/20140219090943/https://developers.google.com/glass/design/ui/, p. 1-3 (Feb. 18, 2014).
Steptoe, "AR-Rift (Part 1)," William Steptoe, http://willsteptoe.com/post/66968953089/ar-rift-part-1, p. 1-4 (2014).
Trew, "A look at Optinvent's updated Ora smartglasses (hands-on)," Engadget, https:www.engadget.com/2014/03/18/optivent-updated-ora-hands-on/, p. 1-2, (Mar. 18, 2014).
Travis et al., "Wedge Optics in Flat Panel Displays," Proceedings of the IEEE 101, 1, p. 45-60 (2013).
Lanman et al., "Near-eye light field displays," ACM Trans. Graph. 32, 6 (Nov.), 220:1-220:10 (2013).
Kress et al., "A review of head-mounted displays (HMD) technologies and applications for consumer electronics," In Proc. SPIE, vol. 8720 (2013).

(56) References Cited

OTHER PUBLICATIONS

Maimone et al., "Computational augmented reality eyeglasses," Mixed and Augmented Reality (ISMAR), 2013 IEEE International Symposium, p. 29-38 (2013).
"Smart Glasses: A New Way of Seeing the World," Epson—Exceed Your Vision, Epson Moverio BT-300 and BT-200 Smart Glasses—Epson America, Inc. http://www.epson.com/cgi-bin/Store/jps/Landing/moverio-augmented-reality-smart-glasses.do, p. 1-3 (Nov. 27, 2013).
"A New Architecture," Innovega—the Future of Personal Media, Innovega Inc.—Product—A New Architecture, https://web.archive.org/web/201321129020043/http://innovega-inc.com/new-architecture.php, p. 1-2 (Nov. 29, 2013).
"Taking your vision to the ultimate level," Seeing through, Seeing beyond, A vision ahead, Lumus—A vision ahead, https://web.archive.org/web/20131103193358/http://www.lumus-optical.com/, p. 1-2 (Nov. 3, 2013).
Swirski et al., "Robust real-time pupil tracking in highly off-axis images," Proceedings of ETR, p. 1-4 (2012).
Pamplona et al., "Catra: Interactive measuring and modeling of cataracts," ACM SIGGRAPH 2011 Papers, ACM, New York, NY, USA, SIGGRAPH 2011 papers, Article 47, p. 1-9 (2011).
Jurik et al., ". Prototyping a light field display involving direct observation of a video projector array," IEEE International Workshop on Projector-Camera Systems (PROCAMS), p. 15-20 (2011).
Benoit-Pasanau et al., "Minimization of diffraction peaks of spatial light modulators using Voronoi diagrams," Opt. Express 18, 14, p. 15223-15235 (Jul. 1, 2010).
Hiura et al., "Krill-eye: Superposition compound eye for wide-angle imaging via grin lenses," IPSJ Transactions on Computer Vision and Application p. 144-157 (2010).
Pamplona et al., Netra: Interactive measuring and modeling of cataracts. ACM SIGGRAPH 2011 Papers, ACM, New York, NY, USA, SIGGRAPH '11, 47:1-47:8, p. 1-9 (2010).
Mohan et al., "Imperceptible visual tags for camera based interaction from a distance," ACM SIGGRAPH 2009 Papers, ACM, New York, NY, USA, SIGGRAPH '09, 98:1-98:8, p. 1-8 (2009).
Son et al., "Three-dimensional imaging system based on a light-emitting diode array," Optical Engineering 46(10), p. 103205(1)-103205(4) (2007).
Levola, "Diffractive optics for virtual displays," In Journal of the Society for Information Display, p. 467-475 (2006).
Brown et al., "Camera-based calibration techniques for seamless multiprojector displays," Visualization and Computer Graphics, IEEE Transactions on 11, 2, p. 193-206 (2005).
Final Office Action and Examiner Initiated Interview Summary for U.S. Appl. No. 15/423,198 (dated Nov. 9, 2017).
Johnson et al., "Assessing visual discomfort using dynamic lens and monovision displays," 3D Image Acquisition and Display: Technology, Perception and Applications, Optical Society of America, TT4A.1, pp. 1-3 (2016).
Kramida et al., "Resolving the vergence-accommodation conflict in head mounted displays," Department of Computer Science, University of Maryland, pp. 1-17 (2016).
"Microsoft HoloLens—Official Site," Bring ideas to life, Microsoft, http://www.microsoft.com/microsoft-hololens/en-us, pp. 1-11 (Accessed Oct. 3, 2016).
"Augmented Reality—Home," Meta Company, https://www.metavision.com, pp. 1-8 (Accessed Sep. 25, 2016).
"Varioptic—Home—Liquid Lens Solutions, Auto Focus M12 and C-mounted lens modules," Varioptic—a Business Unit of Parrot, http://www.varioptic.com/ pp. 1-3 (Accessed Sep. 25, 2016).
"Focus Tunable Lenses—Overview," Optotune, http://www.optotune.com/products/focus-tunable-lenses, Accessed Oct. 3, 2016, pp. 1-2 (2016).
Konrad et al., "Novel optical configurations for virtual reality: Evaluating user preference and performance with focus-tunable and monovision near-eye displays," Proceedings of the ACM Conference on Human Factors in Computing Systems (CHI16), pp. 1-10 (2016).

Seghir et al., "Extended PDMS stiffness range for flexible systems," Sensors and Actuators A: Physical, 230, pp. 33-39 (2015).
Aksit et al., "Slim near-eye display using pinhole aperture arrays," Applied optics, vol. 54, No. 11, pp. 3422-3427 (2015).
Benko et al., "FovAR: Combining an optically see-through near-eye display with Spatial Augmented Reality Projections," Proceedings of the 28th Annual ACM Symposium on User Interface Software & Technology, pp. 129-135 (2015).
Kim et al., "Three-dimensional holographic head mounted display using holographic optical element," Consumer Electronics (ICCE), 2015 IEEE International Conference, pp. 132-133 (2015).
Huang et al., "The light field stereoscope: Immersive Computer Graphics via Factored Near-Eye Light Field Displays with Focus Cues," ACM SIGGRAPH Emerging Technologies, pp. 1-12 (2015).
Johnson et al., "Dynamic lens and monovision 3D displays to improve viewer comfort" arXiv preprint arXiv:1512.09163, UC Berkeley—UCSF Graduate Program in Bioengineering, pp. 1-19 (2015).
Maimone et al., "Pinlight displays: wide field of view augmented reality eyeglasses using defocused point light sources," ACM SIGGRAPH 2014 Emerging Technologies Booth 203, ACM, pp. 1-2 (2014).
Hua et al., "A 3d integral imaging optical see-through head-mounted display," Optics express, vol. 22, No. 11, pp. 13484-13491 (May 28, 2014).
Hu et al., "High-resolution optical see-through multi-focal-plane head-mounted display using freeform optics," Optics express, vol. 22, No. 11, pp. 13896-13903 (May 30, 2014).
Maimone et al., "Pinlight displays: wide field of view augmented reality eyeglasses using defocused point light sources," ACM Trans. Graph. 33, 4, Article 89, pp. 89:1-89:11 (Jul. 2014).
Lanman et al., "Near-eye light field displays" NVIDIA Research, pp. 1-10 (2013).
Tag Optics Inc., Home—Revolutionizing Adaptive Optics Through Acoustics, http://www.tag-optics.com/, p. 1 (copyright 2012).
Guenter et al., "Foveated 3D Graphics," ACM Trans. Graph. 31 6, Article 164 (TOG), pp. 164:1-164:10 (Nov. 2012).
Carmigniani et al., "Augmented reality technologies, systems and applications," Multimedia Tools and Applications, 51(1), pp. 341-377 (2011).
Yamazaki et al., "Simultaneous self-calibration of a projector and a camera using structured light," In Proc. Projector Camera Systems, pp. 1-8 (2011).
Shibata et al., "The zone of comfort: Predicting visual discomfort with stereo displays," J. Vision 11(8) pp. 1-53 (2011).
Kruijff et al., "Perceptual issues in augmented reality revisited," IEEE International Symposium on Mixed and Augmented Reality, pp. 3-12 (2010).
Liu et al., "An optical see-through head mounted display with addressable focal planes," Mixed and Augmented Reality, ISMAR 2008, 7th IEEE/ACM International Symposium, pp. 33-42 (2008).
Werber et al., "Tunable pneumatic microoptics," Journal of Microelectromechanical Systems, vol. 17, No. 5, pp. 1218-1227 (Oct. 2008).
Hoffman et al., "Vergence-accommodation conflicts hinder visual performance and cause visual fatigue," J. Vision 8(3), pp. 1-48 (2008).
Kiyokawa, "A wide field-of-view head mounted projective display using hyperbolic half-silvered mirrors," Proceedings of the 2007 6th IEEE and ACM International Symposium on Mixed and Augmented Reality, IEEE Computer Society, pp. 1-4 (2007).
Nagahara et al., "Super wide field of view head mounted display using catadioptrical optics," Presence, vol. 15, No. 5, pp. 588-598 (2006).
Wang et al., "Depth-of-focus of the human eye: Theory and clinical implications," Survey of Ophthalmology, vol. 51, No. 1, pp. 75-85 (Feb. 2006).
Wang et al., "Depth-of-focus of the human eye in the near retinal periphery," Vision Research 44, pp. 1115-1125 (2004).
Dodgson, "Variation and extrema of human interpupillary distance," Electronic imaging 2004, International Society for Optics and Photonics, Proceedings of SPIE, pp. 1-11 (2004).

(56) References Cited

OTHER PUBLICATIONS

Kasthurirangan et al., "Amplitude dependent accommodative dynamics in humans," Vision Research, 43(27), pp. 2945-2956 (2003).
Mansell et al., "Deformable mirror development at Stanford University," International Symposium on Optical Science and Technology, Proceedings of SPIE vol. 4493, pp. 1-12 (2002).
Heron et al., "Dynamics of the accommodation response to abrupt changes in target vergence as a function of age," Vision Research, 41(4), pp. 507-519 (2001).
McKay et al., "Membrane-mirror based autostereoscopic display for tele-operation and teleprescence applications," Electronic Imaging, International Society for Optics and Photonics, pp. 198-207 (2000).
Arthur, "Effects of field of view on performance with head-mounted displays," PhD thesis, University of North Carolina at Chapel Hill, 149 pages (2000).
McKay et al., "Membrane Mirror Based Display for Viewing 2D and 3D Images," Electronic Imaging'99, International Society for Optics and Photonics, pp. 144-155 (1999).
Kotulak et al., "The accommodative response to subthreshold blur and to perceptual fading during the Troxler phenomenon," Perception, vol. 15(1), pp. 7-15 (1986).
Ronchi et al., "Depth of focus in peripheral vision," Ophthalmic Res, 7(3), pp. 152-157 (1975).
Rawson, "Vibrating varifocal mirrors for 3-D imaging," IEEE Spectrum, 6(9), pp. 37-43 (1969).
Spencer et al., "General ray-tracing procedure," JOSA, 52(6), pp. 672-678 (1962).
Campbell, "The depth of field of the human eye," Optica Acta: International Journal of Optics, 4(4), pp. 157-164 (1957).
Lippmann, "Epreuves reversible donnant la sensatation du relief," Comptes-Rendus Academie des Sciences, 146, (translation included), pp. 821-825 (1908).

\* cited by examiner

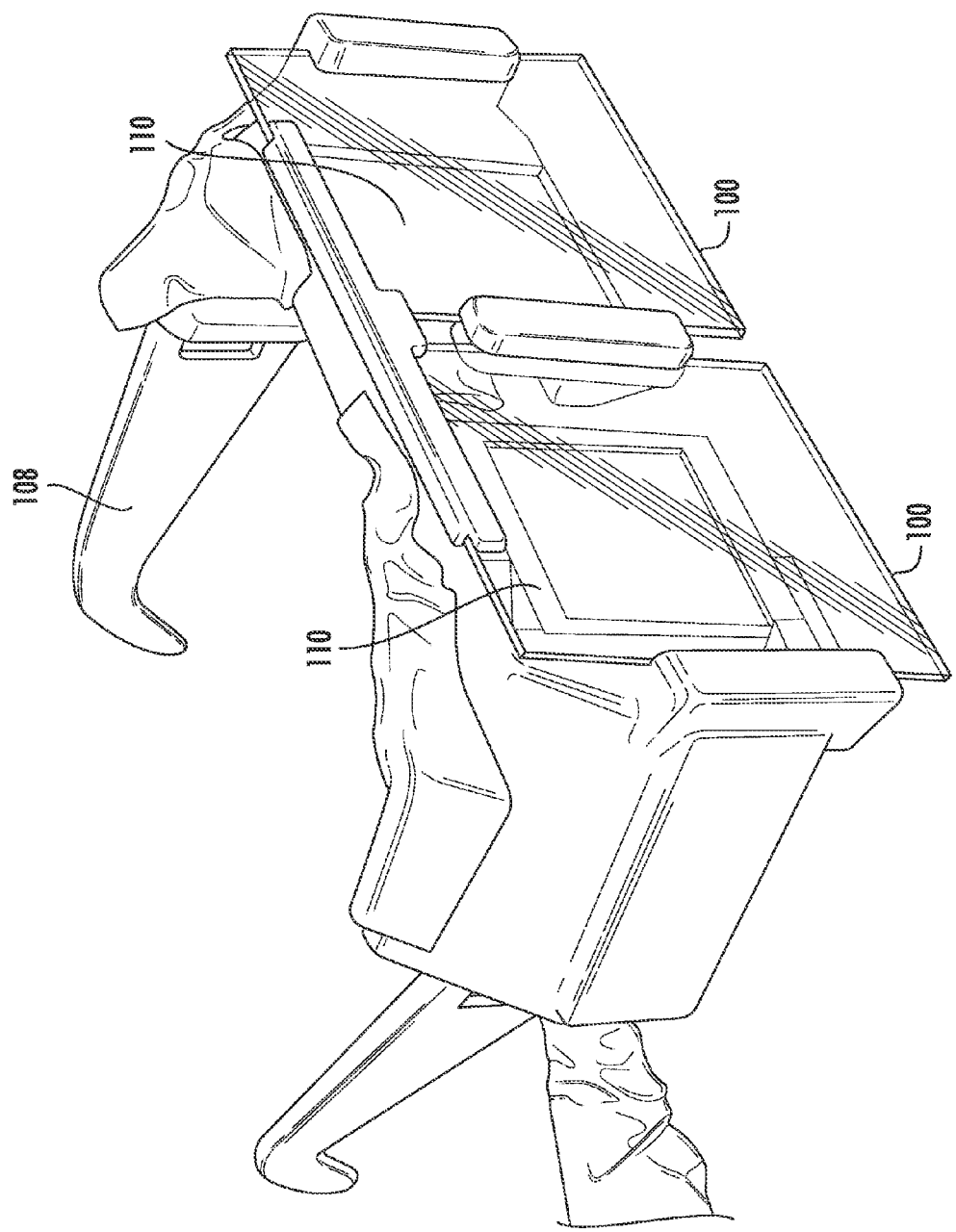

OPTICAL SEE-THROUGH NEAR-EYE DISPLAY USING POINT LIGHT SOURCE BACKLIGHT

PRIORITY CLAIM

This application claims the priority benefit of U.S. Provisional Patent Application Ser. No. 61/918,385, filed Dec. 19, 2013; the disclosure of which is incorporated herein by reference in its entirety.

GRANT STATEMENT

This invention was made with government support under grant no. IIS-1319567 awarded by the National Science Foundation. The government has certain rights in the invention.

TECHNICAL FIELD

The subject matter described herein relates to augmented reality displays. More particularly, the subject matter described herein relates to an optical see-through near-eye display using a point light source backlight.

BACKGROUND

Optical see-through displays are displays used in augmented reality (AR) applications where a synthetic image is displayed on a transparent display so that the user can view the real world through the display along with the synthetic image. A near-eye optical see-through display is an optical see-through display that is designed to be placed near the user's eyes. Examples of near-eye optical see-through displays include eyeglasses-mounted displays and other head-mounted displays.

One problem with conventional optical see-through near-eye displays is that the field of view of the synthetic image is limited to a fraction of the user's total field of view. As a result, synthetic images may appear cropped and, and tracked images may disappear and re-appear when the user's head moves. In some AR applications, it may be desirable for synthetic images to fill all of the user's horizontal field of view or at least the field of view that the user would normally see through corrective lenses in eyeglasses (about 100°). Conventional optical see-through displays provide less than a 100° field of view and many have complex optics, which increases the size and cost of the display unit. Accordingly, there exists a need for a compact optical see-through near-eye display with an improved field of view.

SUMMARY

According to one aspect, the subject matter described herein includes a near-eye optical see-through display. The display includes a backlight layer including a plurality of point light sources. The display further includes a spatial light modulator (SLM) layer for modulating light from the point light sources. The spatial light modulator is located in the optical path between the point light sources and the eye. The spatial light modulator layer includes pixels that are controllable to modulate light from the point light sources such that light that impacts a user's eye has a desired intensity and color to display a synthetic image. At least a portion of the backlight layer and the spatial light modulator layer are optically transparent to allow a user to view a real scene through the spatial light modulator layer and the backlight layer such that the synthetic image appears to be overlaid on a view of the real scene. Each pixel in the spatial light modulator layer modulates only a portion of the light emanating from the point light sources that enter the eye, such that the synthetic image appears to be in focus to the user's eye.

As used herein, the term "synthetic image" refers to any image that is desired to be superimposed on a user's view of a real scene. The synthetic image may be an image of a real object captured by a camera or a virtual image generated by a computer and that is not an image of a real object captured by a camera.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 1B is a perspective view of a prototype of an optical see-through near-eye display according to an embodiment of the subject matter described herein. The display includes pinlight arrays and spatial light modulators, which in the illustrated example are liquid crystal displays. The spatial light modulators code the defocused pinlights to form an image on the retina;

FIG. 6A illustrates the array manufacturing process by creating small divots in an acrylic sheet using a needle attached to a robotic arm. FIG. 6B illustrates that the waveguide contains a sparse array of divots. In FIG. 6C, the divots are imperceptible and see-through when viewed with a camera with an aperture and focus similar to a human eye. FIG. 6D illustrates that when illuminated from the side with an LED, bright light spots appear in the waveguide. FIG. 6E illustrates that when defocused near the camera, the pinlights form discs that tile the image plane. FIG. 6F is a line drawing of a lateral view of the waveguide illustrating how the surface imperfections in the waveguide create the pinlights;

FIG. 10A illustrates defocused pinlights forming overlapping discs on the image plane. FIG. 10B illustrates a hexagonal aperture encoded in a modulation pattern. FIG. 10C illustrates a displayed modulation pattern without the pinlights illuminated causing an out of focus image to appear. FIG. 10D illustrates a displayed modulation pattern with the pinlights illuminated, causing an in focus image to appear. FIG. 10E illustrates the virtual image displayed with a periodically displayed occlusion mask, improving see-through ability;

FIG. 11A illustrates a modulation pattern for an augmented image sent to a display for a blue color channel. FIG. 11B illustrates a photograph of a display while the blue color channel is displayed. FIG. 11C illustrates a modulation pattern sent to the display as an occlusion mask. FIG. 11D illustrates a photograph of the display while the occlusion mask is shown. FIG. 11E illustrates a simulated reproduction of the augmented image. FIG. 11F illustrates a photograph of an actual augmented image in background taken over a complete color and occlusion cycle;

FIG. 12A illustrates a user interacting with a virtual image of a teapot. FIG. 12B illustrates a synthetic image of a tie fighter displayed over a real image of a poster on a wall in a room. FIG. 12C illustrates text displayed to fill the entire field of view. FIG. 12D illustrates a magnified image of a portion of the image in FIG. 12C, which represents a horizontal field of view of approximately 12°;

DETAILED DESCRIPTION

Figure 1A:
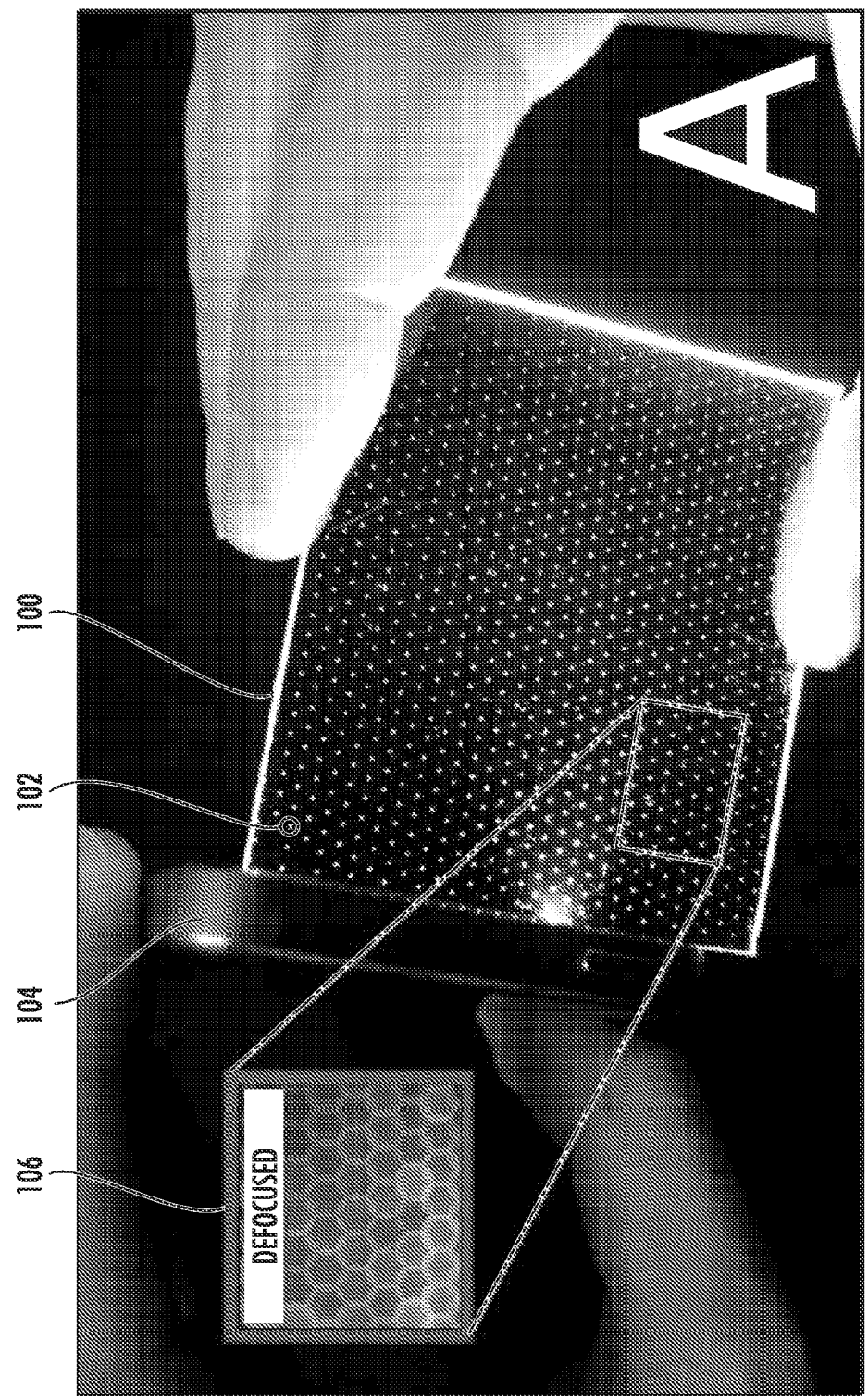
FIG. 1A is an image of a sparse array of point light sources, referred to herein as pinlights that fill the eye's image plane when held defocused near the eye.

We present a novel design for an optical see-through augmented reality display that offers a wide field of view and supports a compact form factor approaching ordinary eyeglasses. Instead of conventional optics, our design uses only two simple hardware components: an SLM and an array of point light sources (e.g. implemented as an edge-lit, etched acrylic sheet) placed directly in front of the eye, out of focus. We code the point light sources through the SLM to form miniature see-through projectors. A virtual aperture encoded on the SLM allows the projectors to be tiled, creating an arbitrarily wide field of view. Software rearranges the target augmented image into tiled sub-images sent to the display, which appear as the correct image when observed out of the viewer's accommodation range. Spatial resolution may be increased through the use of eye tracking. We demonstrate feasibility through software simulations and a real-time prototype display that offers a 110° diagonal field of view in the form factor of large glasses.

1 Introduction

Augmented reality (AR) offers a tantalizing vision for the future. Imagine leaving home to proceed along directions placed neatly on the sidewalk; along the way, a glance across the street yields the menu for a cafe, prompting us to stop and share coffee with a remote friend apparently seated across the table. In this example, we imagine casually harnessing graphics with meaningful spatial connections to the world, at a moment's notice and at many moments throughout the day. We imagine computer graphics transitioning from a distinctly external entity into a part of human vision.

Realizing this vision requires advances in many disciplines—low-latency rendering, tracking, application development, mobile computing, localization, networking—but perhaps the most fundamental problem is obtaining a suitable display. A display that satisfies the long-term potential envisioned for AR must satisfy two key requirements:

Wide Field of View: Field of view (FOV) is a critical attribute of a spatially registered AR display. A synthetic object or information overlay registered to the world, however small, may over time appear anywhere in a viewer's field of view as the viewer moves. Most envisioned AR applications also expect that a synthetic overlay could, at any given moment, fill an arbitrarily large portion of the viewer's FOV. Therefore, if the field of view of an AR display is less than the viewer's total field of view, registered objects and overlays will be cropped or will disappear and reappear with head motion. This reduces the effectiveness of the display: the user now must take an active role to discover and keep synthetic overlays in view, may not receive complete information at any instant, and may have a reduced sense that overlays represent synthetic objects that are present in the world. Although the field of view of the human eye is nearly 180°, the field of view achieved through the corrective lenses of ordinary eyeglasses—which generally span a ≥100° horizontal FOV—suggests a pragmatic target.

Non-Encumbering: A display intended for casual and extended use must be ready to use in an instant, must be comfortable, and must not interfere with other tasks when not being used. This requires a non-encumbering design: it must not be too bulky, and must not significantly degrade normal human sight. As with field of view, ordinary eyeglasses or sunglasses demonstrably achieve an acceptable level of encumbrance and provide a target standard. Although some bulk is generally accepted for research prototypes, it is important to consider the minimum size supported by a given design, which often has a hard lower limit due to optical constraints.

Recent developments in optical see-through near-eye displays, which superimpose synthetic imagery over a viewer's natural sight, tackle these two key requirements in isolation. Such devices have been demonstrated with a wide FOV (e.g. Cheng et al. [2011]) and in non-encumbering forms (e.g. Google Glass, Lumus DK-32). However, to date no practical design has demonstrated both a wide field of view and low encumbrance in a single AR device.

The crux of the problem is that these requirements typically place opposing constraints on the optical hardware design. For example, optical see-through devices that place a beamsplitter embedded in a waveguide in front of the eye (e.g. Epson Moverio BT-100) have a field of view that increases with the thickness of the waveguide; in the case of the Epson device, the field of view is limited to 23° diagonally while keeping the device acceptably thin and light.

In contrast, we present a novel optical see-through near-eye display design that provides a wide field of view and supports a compact and lightweight form factor that approaches ordinary eyeglasses. We replace conventional optical approaches, such as waveguides and beamsplitters, with a design that combines simple hardware and lightweight computation. We avoid the need for any optical refractive, reflective, or diffractive components that could limit field of view, and use only two simple and readily manufactured hardware components: an LCD panel and a sparse array of small, bright point light sources, formed on a patterned edge-lit acrylic sheet, that we call pinlights. Our core innovation is the use of defocused point light sources coded through a transmissive spatial light modulator (SLM) to form miniature, see-through, and therefore imperceptible projectors. These miniature projectors direct light into the lens of the eye through a virtual aperture, allowing their small image areas to be tiled to create an arbitrarily wide field of view. Software decomposes the target image into a series of tiled sub-images (displayed on the SLM) that each correspond to a miniature projector with a virtual aperture. We demonstrate the feasibility of our approach through a real-time prototype display in the form factor of large glasses that offers a 110° diagonal field of view.

1.1 Contributions

We present a novel approach to see-through near-eye displays. Specific contributions include:
- the use of point light sources, coded with an LCD and placed near the eye, that act as imperceptible, see-through projectors
- the use of such projectors in a tiled configuration encoded with a virtual aperture to expand the FOV of the display
- the use of such tiled projection arrays in an alternative configuration to provide a light field over the eye, as a see-through alternative to existing near-eye light field displays
- an example hardware design for creating transparent tiled projection arrays, described and evaluated in a prototype device 1.2 Benefits The proposed design offers several benefits over existing see-through near-eye displays. A wide FOV is supported with no theoretical upper bound (or approaching 180° if the display components are planar), and a prototype achieving a 110° diagonal FOV is demonstrated. The design also supports a lightweight, eyeglasses-like form factor and uses simple, low cost hardware components.

2 Related Work

Near-Eye See-Through Displays

Near-eye displays, particularly optical see-through systems, have experienced a groundswell of consumer enthusiasm over the last year, initiated in part by the joint introduction of Google Glass (narrow field of view AR) and Oculus Rift (low-cost yet immersive VR). However, the optical designs underpinning the majority of these commercially-announced devices have been maturing over decades of research. Kress and Starner [2013] provide a concise survey of the state-of-the-art in near-eye displays. We briefly survey these systems, studying their benefits and limitations relative to our new pinlight projection system.

Freeform optics innovate on the traditional beamsplitter approach to achieve optical see-through, leveraging the complex, aspheric surfaces afforded by modern optical fabrication methods [Cakmakci et al. 2010; Cheng et al. 2011]. Rather than employing a planar combiner and separate relay lens elements, a single optical "prism" is manufactured to unify the functions of relaying, magnifying, and combining the virtual image. Aberrations of the virtual and physical environments are corrected by jointly optimizing the optical surfaces. Freeform optics replace the bulk of head-mounted relay optics with precision-manufactured prisms; however, their FOV remains limited, with the volume of the prism growing proportionally to the target FOV. Waveguide-based designs can overcome this limitation: temple-mounted projectors are used to shine light into a flat waveguide, where it travels by total internal reflection (TIR) to an out-coupling element that redirects the image to the viewer's eye. Waveguide approaches are differentiated by the composition of the out-coupling (and associated in-coupling) elements. Systems such as the Lumus DK-32 and the Optinvent ORA-S utilize a set of cascaded extractors comprising an array of precisely-aligned semi-reflective mirrors. Alternatively, diffractive optical elements have been successfully employed to achieve out-coupling, including grating patterns and more general volume holograms [Levola 2006]. The FOV of such systems is restricted by the TIR angle supported by the waveguide, practically limiting systems at the moment to less than roughly 60°.

Our use of a direct-view LCD panel, with no additional relay, magnification, or combining optics, is shared by only a handful of near-eye displays. The recently-announced Innovega iOptik display system uses a direct-view display and a custom contact lens. The contact lens employs polarization-selective filters and an embedded microlens to transform the viewer's accommodation range: the central portion of the pupil becomes capable of focusing on the near-eye display (through the microlens), whereas the outer annulus retains the viewer's natural accommodation range. In a closely-related work, Maimone and Fuchs [2013] propose a near-eye display composed of compact stacks of 2-3 direct-view LCD panels. This multi-layered display presents a series of time-multiplexed attenuation patterns—at greater than the human flicker fusion threshold—creating a near-eye light field display. Similar to our design, eye tracking significantly enhances resolution. We emphasize that the pinlight approach differentiates itself by eliminating the need for contact lenses or complex, multi-layered LCD panels.

Coded Projections Using Defocused Optical Elements

Our development of near-eye coded pinlight projectors is related to defocused projection systems. In the computer graphics community, Mohan et al. [2009] present one of the earliest such designs; their "Bokode" system uses a combination of a backlit, microprinted transparency covered with a microlens to project an image at optical infinity from an aperture of a few millimeters. A coded image is formed when observed with a defocused wide-aperture camera, allowing extremely compact substitutes for traditional 2D barcodes. Hiura et al. [2010] extend this approach to curved arrays of Bokodes, which they dub "Krill-eye beacons" due to the optical similarity with refracting superposition compound eyes in decapods. In contrast to our system, these beacons rely on refractive lenses and are intended to be distantly located from any imager.

Pamplona et al. [2010; 2011] demonstrate near-eye applications of these principles to interactively assess the refractive errors of human subjects. In their system, a near-eye light field display is created by covering a microdisplay with either a microlens array or a pinhole grid to present test patterns containing accommodation cues. Recently, Lanman and Luebke [2013] show that such systems can be optimized for general display applications, demonstrating lightweight, thin-form-factor virtual reality eyeglasses. We emphasize that, while sharing conceptual similarities, neither approach directly facilitates optical see-through applications: refractive microlens arrays irrevocably distort the viewer's perspective.

We also find similarities with a specialized class of light field displays: those exploiting parallax illumination. In a related work, Son et al. [2007] substitute a 2D point light source (PLS) array for the microlenses and pinholes (or parallax barriers) routinely found within light field displays. As with our pinlight projectors, multiview imagery is projected by displaying a coded array of elemental images on an LCD placed in front of the PLS array. We also find similarities in our approach to projector-based displays. Jurik et al. [2011] describe a light field display in which each projector in a dense array acts as a single display "pixel" with a high degree of angular variation. We emphasize that, unlike pinlight displays, PLS arrays and projection arrays are designed to function within the accommodation range of the observer (e.g. as a desktop 3D display). Furthermore, we demonstrate architectures for making these arrays imperceptible in near-eye use. Instead of the LED array of Son et al. [2007], or the pico projectors of Jurik et al. [2011], we use an edge-lit acrylic sheet with a pattern of microdivots.

3 System Overview 3.1 Introduction

Optical see-through near-eye displays place synthetic imagery over one's natural vision using a device placed closer than the eyes can focus. Such displays have two primary goals: (1) to adjust for the focal range of the eye, while (2) preserving the ability to see the real world through the display. Displays using conventional optical approaches address these functions with additional components, such as lenses and beamsplitters. These components tend to add complexity and bulk to the design and limit the field of view.

We take an optically simpler approach that avoids these components by designing a highly directional image source that emits light over a very narrow angle and specific orientation for each pixel. Thus, each image pixel acts as a "ray" source (within an approximation), rather than a point source. With this design, the light emitted from each individual pixel of the image source is essentially non-divergent, and can enter the eye directly without corrective optics and regardless of eye focal state. We achieve such an image source by coding the light from a sparse array of point sources with a spatial light modulator. We must, however, account for this different image formation method by preprocessing the image. To preserve the see-through capability, our design uses only transparent components, a see-through point light array and a transmissive SLM, placed directly in front of the eye. This avoids the need for any cumbersome or FOV-limiting components to combine the augmented image and see-through optical paths. In this way, we follow the approach of Maimone and Fuchs [2013] who stacked transmissive SLMs for a see-through near-eye display. We add novelty by achieving transparency using components with small visible features ($\leq 100$ µm) that are imperceptible when defocused.

FIG. 1A illustrates an exemplary point light source for use with embodiments of the subject matter described herein. In FIG. 1A, a backlight layer 100 comprises a rectangular acryllic sheet etched with a plurality of surface features 102 that act as point light sources. When backlight layer 100 is illuminated from an edge, light is emitted through surface features 102 but not between surface features 102. The absence of light between surface features 102 is caused by the flat surface and total internal reflection. In the illustrated example, backlight layer 100 is illuminated using an LED light source 104 for illustrative purposes. Because backlight layer 100 is placed near the user's eye in operation, point light sources 102 will appear out of focus, as illustrated by window 106.

FIG. 1B illustrates a prototype of a near-eye see-through display according to an embodiment of the subject matter described herein. Referring to FIG. 1B, the prototype comprises an eyeglasses frame 108 designed to be worn by a user. Backlight layers 100 are mounted in eyeglasses frame 108 in the same places where corrective lenses would be mounted. Spatial light modulator layers 110, which in the illustrated example are see-through liquid crystal displays, are also mounted within the user's field of view. Spatial light modulator layers 110 encode the defocused point light sources 102 (also referred to herein as pinlights) to form a desired image on the user's retina.

In one embodiment of the subject matter described herein, only the encoded pinlights that contribute to the desired image are illuminated and visible to the wearer. The defocused pinlights that do not contribute to the desired image may be deactivated (i.e. not illuminated) so that they do not project any light towards the eye. Alternatively, all of the pinlights can be illuminated regardless of the desired image content, in which case a see-through image is provided but some additional light is projected where there is no desired image content.

Figure 1C:
FIG. 1C is a photograph taken through the prototype display illustrated in FIG. 1B using a camera that approximates the human eye.

FIG. 1C illustrates an example of a see-through image superimposed on a real image viewed through the prototype illustrated in FIG. 1B. In FIG. 1C, the virtual see-through image comprises an image of a tie fighter from the movie, Star Wars. The real image comprises a view of a room and a poster mounted on a wall in the room. As illustrated in FIG. 1C, the synthetic image occupies a wide field of view with respect to the entire field of view of the user.

Figure 1D:
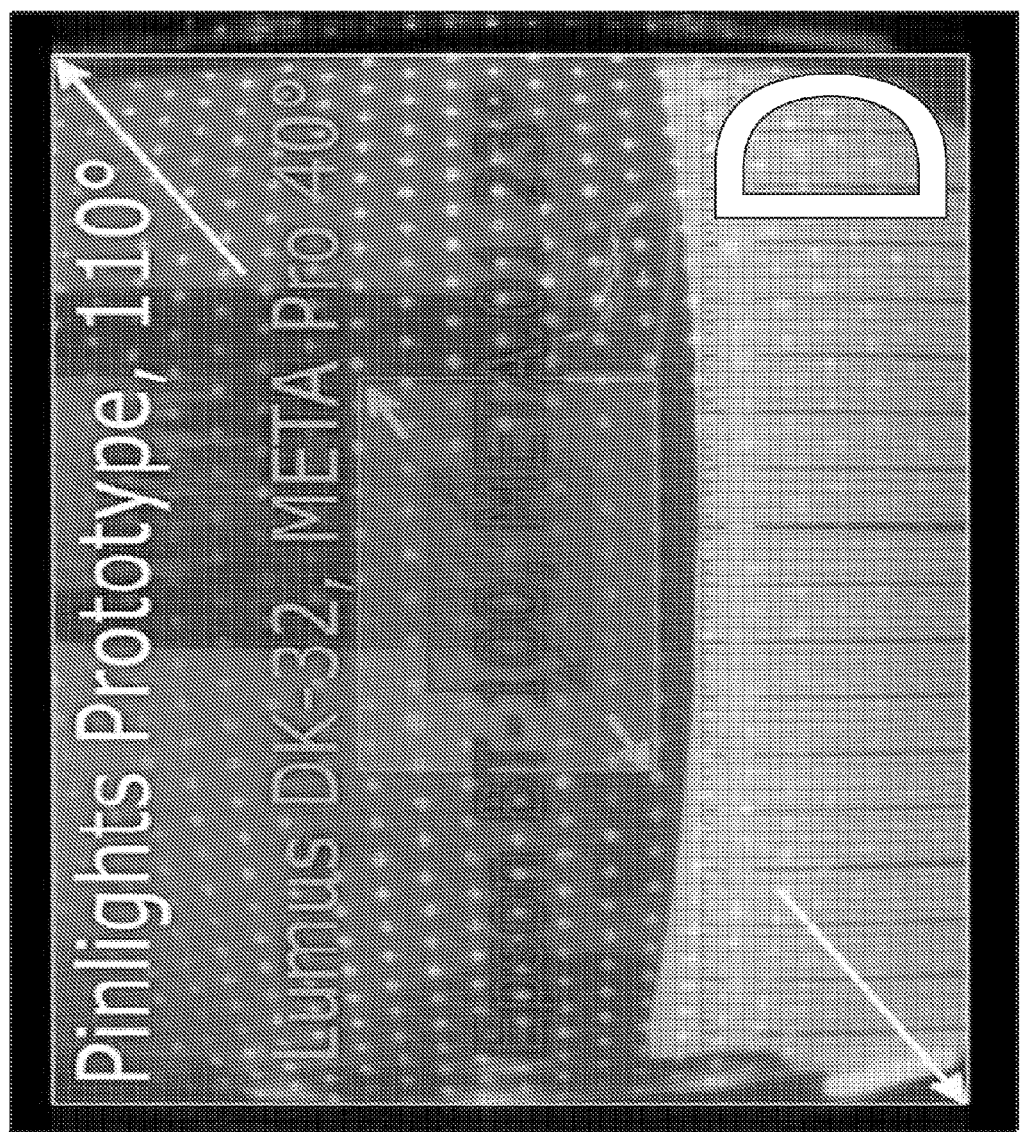
FIG. 1D is an image illustrating a comparison of the field of view of the prototype display in FIG. 1B (110°) to state of the art commercial optical see-through displays.

FIG. 1D is an image comparing the field of view of the prototype display illustrated in FIG. 1B (110°) and other commercial optical see-through glasses. The field of view of the pinlights prototype illustrated in FIG. 1B is 110°. The field of view of the Lumus DK-32, Meta pro is 40°, the field of view of the Epson Moverio BT-100 is 23°.

3.2 Coded Projection with a Single Pinlight

Image Formation

Figure 2:
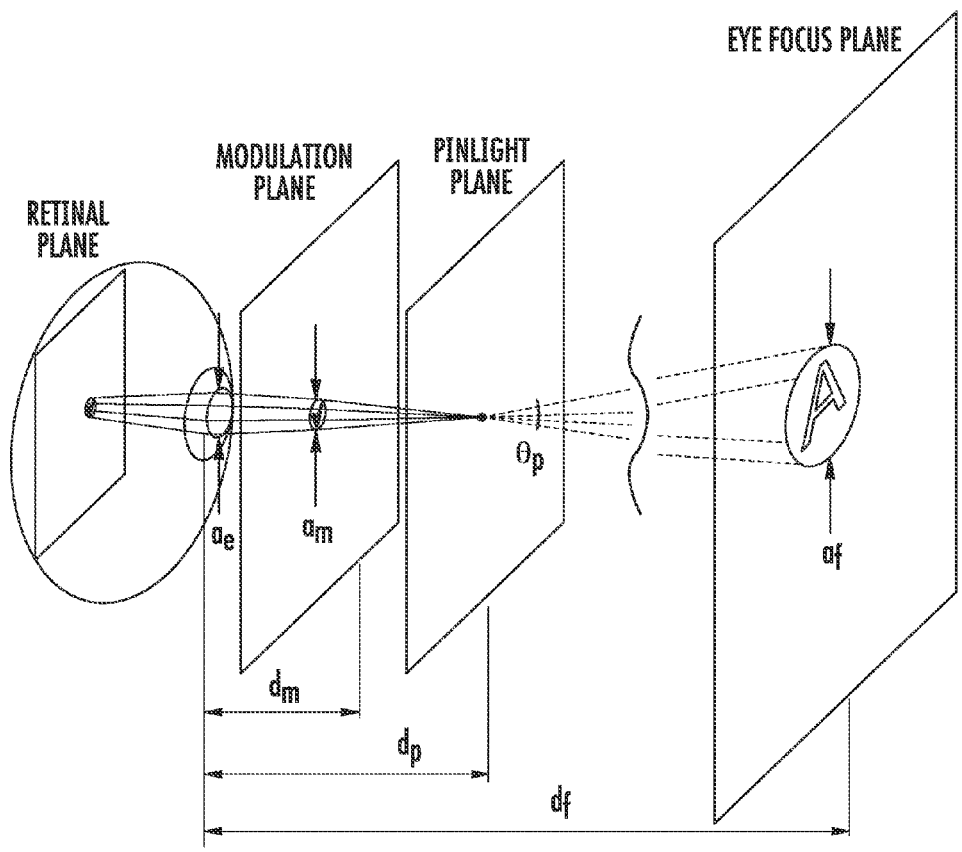
FIG. 2 is a perspective view illustrating pinlight projection. A defocused point light source or pinlight, placed near the eye, is coded with a spatial light modulator to create a narrow field of view image that appears in focus without the use of refractive or defractive optics.

Our core approach is directly encoding light from a defocused point source placed near the eye (outside of the accommodation range), which we call a pinlight, with a transmissive SLM placed between the eye and the pinlight. This system acts as a miniature projector, which we call a pinlight projector, that directs light into the eye as illustrated in FIG. 2. Assuming for simplicity that the pinlight and the pixels on the SLM are true mathematical points, each location on the SLM receives light from a single direction (a "ray") that is modulated and then enters the eye. The set of all rays is refracted by the lens of the eye; however, since the rays originate from a single point their angular ordering is preserved, creating a "sharp" copy of the modulated image on the retina. Since the point source is nearer than the viewer's minimum accommodation or focus distance, the image is not flipped by the eye, and thus the modulated image must be inverted along both axes. The image formed on the retina is "sharp" regardless of the focal state of the eye (much as with a camera with an small pinhole aperture); the eye's focal state changes only the degree of refraction and therefore the scaling of the image formed. Note that the image produced by a pinlight projector is generally round, due to the shape of a human pupil, which adds complexity to optical design as described in Section 3.3. See Section 3.4.1 for details concerning the creation of real point sources with non-zero extent and handling changes in eye state. See-through ability is achieved through the use of transparent components; see Section 3.4.3 for details.

Projection Geometry

From FIG. 2, it can been seen that the necessary diameter of modulation on the SLM $a_m$ and the diameter of the image on the focus plane $a_f$ for a single pinlight projector can be computed as:

$$a_m = a_e\left(1 - \frac{d_m}{d_p}\right), \quad (1)$$

$$a_f = a_e\left(\frac{d_f}{d_p} - 1\right),$$

given eye aperture diameter $a_e$, pinlight plane distance $d_p$, modulation plane distance $d_m$, and eye focus distance $d_f$. Likewise, the field of view $\theta_p$ through the single pinlight can be computed as:

$$\theta_p = 2\tan^{-1}\left(\frac{a_e}{2d_p}\right). \quad (2)$$

The pinlight plane distance $d_p$ and modulation plane distance $d_m$ are the variables under the control of the display designer. From Equation 2, we observe then that the FOV through a single pinlight projector $\theta_p$ is increased by decreasing pinlight plane distance $d_p$. Given a selection of $d_p$, modulation plane distance $d_m$ can be chosen to select the desired modulation scale on the SLM. However, for eye pupil diameter $a_e$=3 mm, the pinlight plane set at a practical distance of $d_p$=25 mm yields a FOV through the pinlight projector $\theta_p$ of only 6.9°. Obtaining a wide field of view of 100° would require an impractically close pinlight plane distance of $d_p$=1.26 mm. However, we explore the use of multiple pinlight projectors to increase the field of view, as described in the following section.

3.3 Coded Projections Using Tiled Pinlight Arrays

A single pinlight projector does not alone provide a useful field of view for an augmented reality display. We observe, however, that multiple pinlight projectors may be tiled to significantly increase the field of view. In this section, we describe various tiling configurations.

Ideal Tiling Geometry

Figure 3:
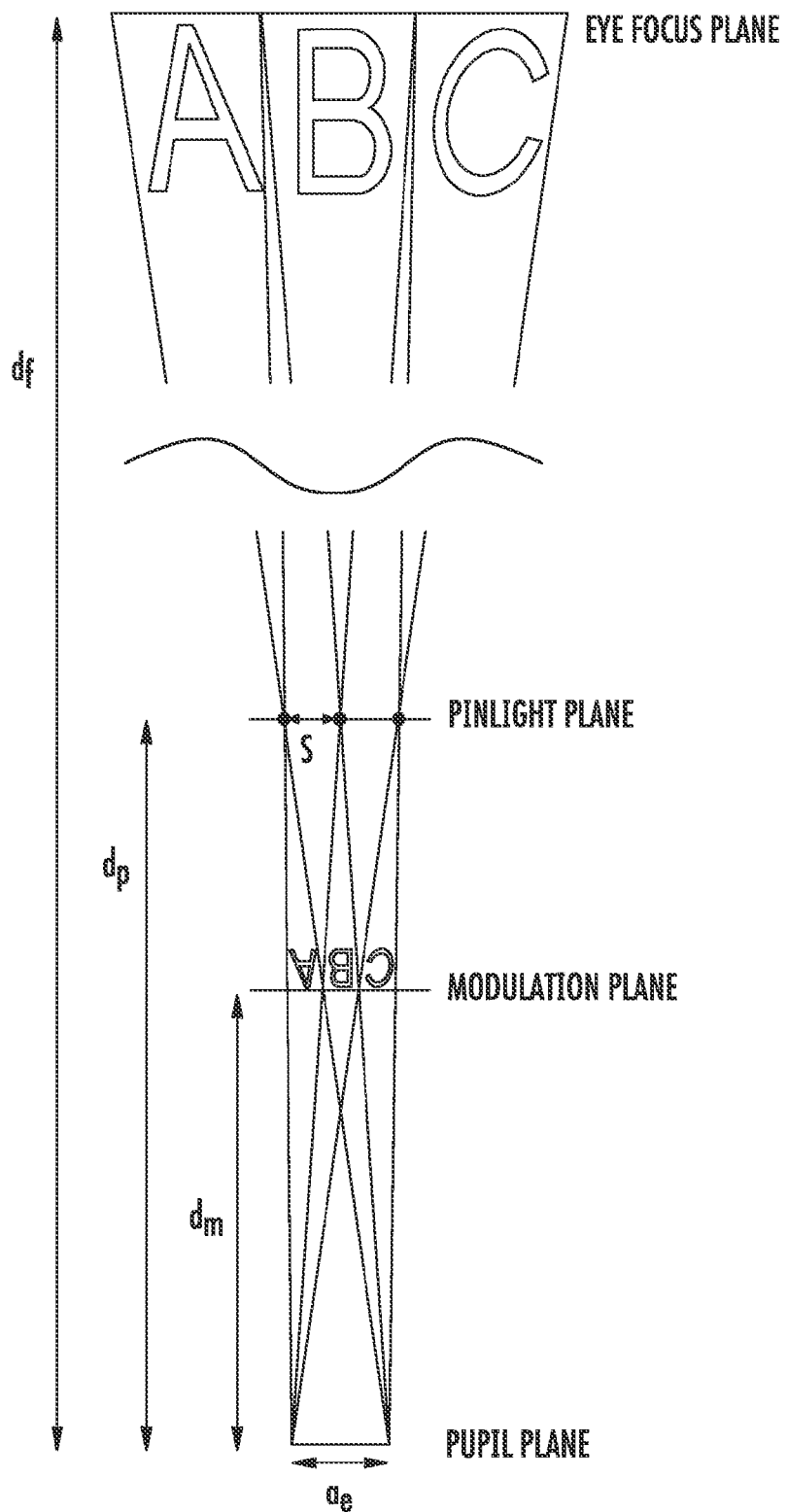
FIG. 3 is a view illustrating ideal tiled pinlight projector geometry. The display is configured that the pinlight projectors abut on the eye focused plane and on the modulation plane, creating a continuous image and using the SLM efficiently. (Note that the pinlights may emit light over a wide angle but only light entering the pupil is shown.)

When tiling pinlight projectors, we assumed that the pinlight plane now contains an array of point light sources, all of which are modulated by a single SLM. Further, we assume that the pinlights emit light over a wide angle so that each is visible to the eye (but we are unconcerned with light rays that do not enter the eye). In this configuration, the pinlights can be tiled to an arbitrarily wide field of view (or approaching 180° if the pinlight array and SLM are restricted to planes) where the total display area is approximately proportional to the number of projectors used, subject to practical limitations on the emission angle of the pinlights and the size and supported viewing angles of the SLM. The tiling must satisfy two primary conditions: the eye focus plane must contain a continuous tiled image among all the projectors, and the modulated areas on the SLM must be disjoint among the projectors. We also aim to maximize resolution by using as much area on the SLM as possible. We first consider an ideal one-dimensional case, illustrated in FIG. 3. Given an eye aperture $a_e$, eye focus distance $d_f$, and pinlight plane distance $d_p$, the optimal pinlight spacing s and modulation plane distance $d_m$ are computed as:

$$s = a_e\left(1 - \frac{d_p}{d_f}\right) \quad (3)$$

and $$d_m = \frac{a_e d_p}{a_e + s}.$$

This spacing ensures that neighboring view cones abut at the modulation plane and focus planes, providing a continuous image at the full resolution of the SLM. Note that the pinlights are placed sparsely (with spacing on the order of the eye aperture (pupil) size) (e.g., about 3 mm between pinlights or surface features 102 on backlight layer 100 illustrated in FIG. 1A), so that the structure of an array of small pinlights will remain imperceptible when defocused. Also note that the display becomes thinner as it is moved nearer the eye (i.e., decreasing $d_p$ decreases $d_p$−$d_m$).

The effective resolution r in terms of the preserved fraction of modulation plane resolution (by area) can be computed as:

$$r = \left(\frac{d_f(d_p - d_m)}{d_m(d_f - d_p)}\right)^2 \quad (4)$$

This equation provides the ratio of the width of a pixel projected onto the focus plane to the total width of the focus plane, squared to provide a ratio by area. Note that this equation assumes that the pinlight geometry is valid; the eye focus plane must contain a continuous tiled image, and the modulated areas on the SLM must be disjoint among projectors. In the ideal configuration, ratio r equals 1: the entire modulation plane has been used to form an image on the focus plane without redundancy. The horizontal field of view $f_h$ from a point on the eye can also be computed as:

$$f_h = 2 \tan^{-1}\left(\frac{c}{2d_m}\right) \quad (5)$$

where c is the width of the modulation plane.

Challenges for Practical Tiling

Tiling has the potential to create a wide field of view display. However, in the ideal 1D case described above we have not considered several factors which must be addressed to create a practical human-wearable display:

The ideal case can only be directly extended to 2D if the image areas created by the pinlight projectors can be tiled; however, a circular image area is created when projecting into the round human pupil, which cannot be tiled without the inclusion of gaps or overlapping areas.

The ideal model assumes that the eye position is fixed relative to the display, an invalid assumption for a viewer wearing glasses. If the eye moves the image will circularly shift within the tiled sub-images corresponding to each pinlight projector, resulting in a corrupted image.

The ideal model is affected by changes in pupil size and focal state, which are expected to change over time.

In the remainder of this section, we address items 1-3 under two alternative configurations. Item 4 is addressed in Section 3.4.5.

3.3.1 Tracked Virtual Aperture Configuration

Eye Tracking

In one alternative tiled configuration, we allow eye movement relative to the display by assuming that the position of the eye on the pupil plane is known (i.e. tracked) and that the image on the modulation plane is adjusted to account for the new eye position. As the eye moves, the view cones that corresponding to each pinlight projector (illustrated in FIG. 3) shift and intersect with a new portion of the intended image on the eye focus plane, which is then flipped and scaled appropriately to be encoded on the corresponding region of the modulation plane (see Section 3.4.4 for details). In this section, we assume theoretical error-free tracking without latency in sensing or display; in Section 3.3.2 we describe how to account for these factors.

Virtual Eye Apertures

Figure 4:
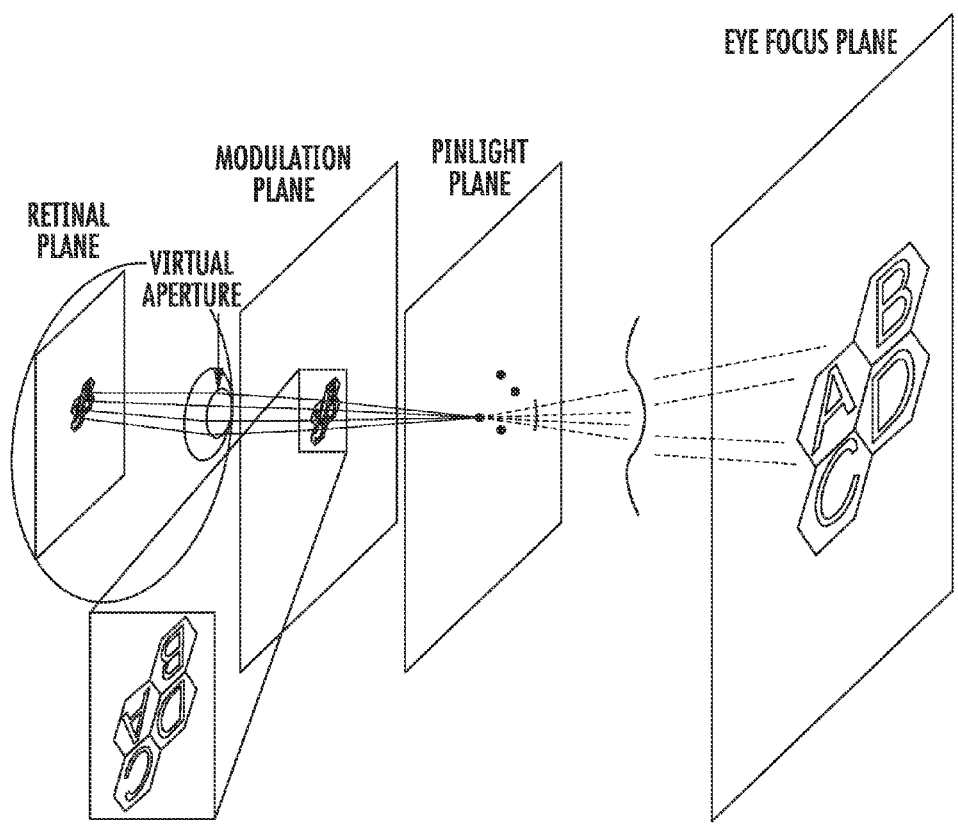
FIG. 4 is a perspective view illustrating tiled pinlights in a tracked virtual aperture configuration. An aperture mask is encoded over the desired image on the modulation plane to create a virtual hexagon aperture over the eye that can be tiled, eliminating toning effects in the perceived image. The image on the modulation plane is recomputed based on the tracked eye position to allow eye movement relative to the display. (Note that the pinlights may emit light over a wide angle, but only light that enters the pupil is shown.)

Although eye tracking allows compensation for eye movements, it does not resolve the issue of how to tile the circular images formed by individual pinlight projectors due to the round aperture of the eye. In particular, if the circular projectors are tiled without overlap, gaps will remain in the image, and if the circles overlap to fill the plane, the overlapping areas will have greater intensity than the non-overlapping areas (see FIG. 6E). Our solution to create an evenly-toned image is to configure the pinlight projectors so that they minimally overlap to fill the focus plane and to encode a virtual aperture over the modulation plane so that light from the overlapping regions does not reach the eye. This process is illustrated in FIG. 4. The virtual aperture has the effect of transforming the viewer's pupil into a shape that can be tiled (e.g. a rectangle or hexagon), as if wearing a contact lens masked with such a shape.

Geometry

The ideal display geometry, given by Equation 3, is updated to support a hexagonal virtual eye aperture as follows.

$$s_{t_h} = \frac{\sqrt{3}}{2} a_e \left(1 - \frac{d_p}{d_f}\right), \quad (6)$$

$$s_{t_v} = \frac{\sqrt{3}}{2} s_{t_h}$$

$$d_{m_t} = \frac{\frac{1}{2}\left(a_e + \frac{\sqrt{3}}{2}a_e\right)d_p}{\frac{1}{2}\left(a_e + \frac{\sqrt{3}}{2}a_e\right) + s_{t_h}} \quad (7)$$

Figure 10A:
FIGS. 10A-10E are images illustrating an exemplary image formation process. The inset images in FIGS. 10A-10E show magnified regions.
Figure 10B:
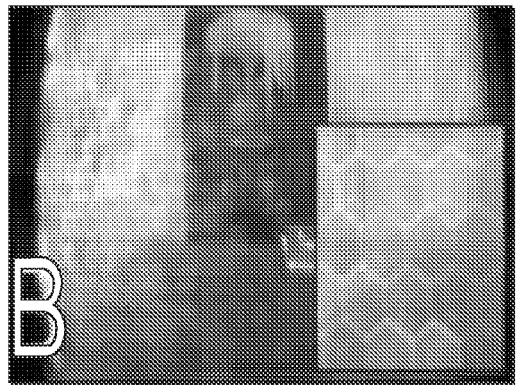

This geometry assumes that the virtual aperture is encoded as a hexagon with vertical left and right sides and a pointed top, as seen in FIG. 10B. Note that the horizontal pinlight spacing $s_{t_h}$ and vertical spacing $s_{t_v}$ are asymmetric and that odd pinlight projector rows should be offset by $$\frac{s_{t_h}}{2}$$

due to the staggered hexagonal packing of the plane. Also note the similarity to the geometry in the ideal case (Equation 3), except that pinlight spacing s has been decreased to allow the circular image areas of the pinlight projectors to overlap to cover the focus plane, and modulation plane distance $d_m$ has been adjusted to allow space for the virtual aperture mask. In particular, a regular hexagon is inscribed into the circular area on the modulation plane that represents each pinlight projector, and $d_{m_t}$ is set so that the projectors are positioned as closely as possible without intersecting the inscribed hexagons of neighboring projectors. This process causes a resolution loss as some of the modulation plane is now dedicated to providing an aperture mask rather than contributing to the virtual image. The resolution loss can be computed according to Equation 4. Equivalently, the effective resolution (by area) in a tracked virtual aperture configuration can be computed as the ratio of the area of the inscribed hexagon in a unit diameter circle $$\left(\frac{3\sqrt{3}}{8}\right)$$

with the area of the larger hexagon that would exactly tile the plane without the virtual aperture mask $$\left(\frac{7\sqrt{3}+12}{32}\right),$$

yielding effective resolution ratio $r_t$:

$$r_t = \frac{12\sqrt{3}}{12+7\sqrt{3}} \approx 86\%. \tag{8}$$

However, spatial resolution loss is very modest compared to existing near-eye light field displays (e.g. [Maimone and Fuchs 2013]) showing the benefit of a design that allocates nearly of all the display area to forming the image perceived by the user, through tracking. Also note that moving the modulation plane closer to the pinlight plane to accommodate the virtual aperture has the positive side effect of creating a slightly thinner display; e.g., an aperture $a_e=3$ mm focused at $d_f=\infty$ with the pinlight plane placed at $d_p=29$ mm now yields a device $d_{m_t}=15$ mm away from the eye that is $d_p-d_{m_t}=14$ mm thick (i.e. 1 mm thinner).

3.3.2 Untracked Light Field Configuration

Near-Eye Light Fields

In another alternative tiled projector configuration, the display is designed to generate a light field near the eye to allow additional capabilities. The display is designed so that the view cones between pinlight projectors overlap away from the display, allowing angular variation in the image among projectors. In particular, one can design the display to allow angular variation around the eye to create an untracked configuration, which we explore in this section. It is also possible to design the display to emit a light field with angular variation over the pupil (creating depth of field). For example, in one embodiment of the subject matter described herein, the point light sources and the spatial light modulator may be configured so that each point in the synthetic image reproduced by two or more modulated rays emitted by the spatial light modulator simultaneously enter a pupil of the user's eye so that the user receives focal depth cues.

Untracked Configuration

Figure 5:
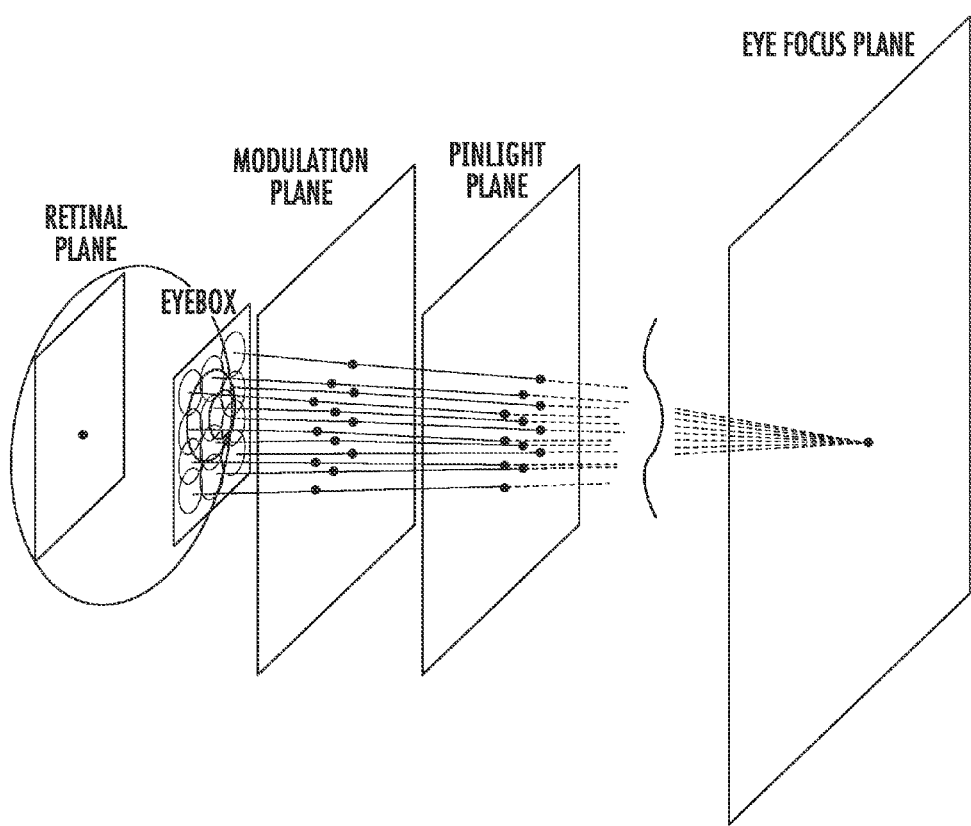
FIG. 5 is a perspective view illustrating an untracked light field configuration. For each point on the eye focus plane, a set of rays is created through a tiled set of pinlight projectors that are distributed about an eyebox near the eye, allowing eye movement. The modulated pixels corresponding to the same point in the scene are distributed over the image.

The tracked display configuration offers high spatial resolution, but the need for pupil tracking adds engineering complexity. An alternative display can be defined with an eyebox, a region in which the eye can move around while still seeing the complete intended image. Here, the display is configured to emit multiple light rays that appear to originate from each point on the eye focus plane, each of which is directed towards different regions of the eyebox, as illustrated in FIG. 5. To maximize resolution, the display geometry minimizes the number of modulated rays emitted from each point on the eye focus plane with assurance that an eye placed anywhere in the eyebox will receive one such ray; Equations 6 and 7 take the following form in this configuration:

$$s_{u_h} = \frac{\sqrt{3}}{2}a_{e_m}\left(1-\frac{d_p}{d_f}\right),$$

$$s_{u_v} = \frac{\sqrt{3}}{2}s_{u_h}, d_{m_h} = \frac{a_{e_b}d_p}{a_{e_b}+s_{u_h}} \tag{9}$$

Horizontal pinlight spacing $s_{u_h}$ and vertical spacing $s_{u_v}$ are defined with respect to a minimum eye aperture $a_{e_m}$; a viewer with a smaller aperture will perceive gaps in the image. Modulation plane distance $d_{m_u}$ defined with respect to a constrained window around the eye $a_{e_b}$, creating an eyebox of size $a_{e_b}-a_e$. Unlike a conventional display, each ray in the eyebox can be modulated individually, allowing different images to be perceived with eye movement and without tracking. The display is considerably thinner in this configuration; an eye with minimum aperture $a_{e_m}=3$ mm and eyebox of $a_{e_b}-a_e=7$ mm (when $a_e=a_{e_m}$) focused at $d_f=\infty$ with the pinlight plane at $d_p=18.9$ mm yields a device $d_{m_u}=15$ mm from the eye that is $d_p-d_{m_u}=3.9$ mm thick.

3.4 Practical Implementation Details

In this section, we address issues of realizing a display based on the tiled pinlight projector method that is practical for human viewers.

3.4.1 Creating Point Light Sources

Requirements

To create point light sources for pinlight projectors, we note three primary requirements. First, the pinlight sources should be very bright, i.e. the total light emitted should be on par with a normal display panel, but concentrated into the much smaller area of a sparse grid of dots. Second, the emission area of each pinlight should be very small (i.e. on the order of the size of a pixel on the SLM) as the image formed is essentially convolved with the pinlight shape. To maximize resolution, the effective aperture size of the SLM pixels (with consideration for the pixel fill factor) plus the size of the pinlight should be less than or equal to the pixel pitch of the SLM. Finally, the pinlight array should be highly transparent and any of the structures composing the pinlight array should be small enough as to be imperceptible when defocused.

Implementation

As stated above with regard to FIG. 1A, our prototype implementation is a waveguide (an acrylic sheet) that is etched with tiny divots and edge illuminated with LEDs, as illustrated in FIG. 6A-6F. Light from the LEDs is channeled through the waveguide to the opposite side except where it encounters the divots, which scatter light and cause bright spots to appear. The divots were etched using a needle attached to the moving robotic platform, which was programmed to create a staggered pinlight array according to Equation 6. The etched features may be visible, but the pinlight array appears completely clear when held near the eye, out of focus. The divots may also created through a process of laser drilling.

Figures 6A, 6B:
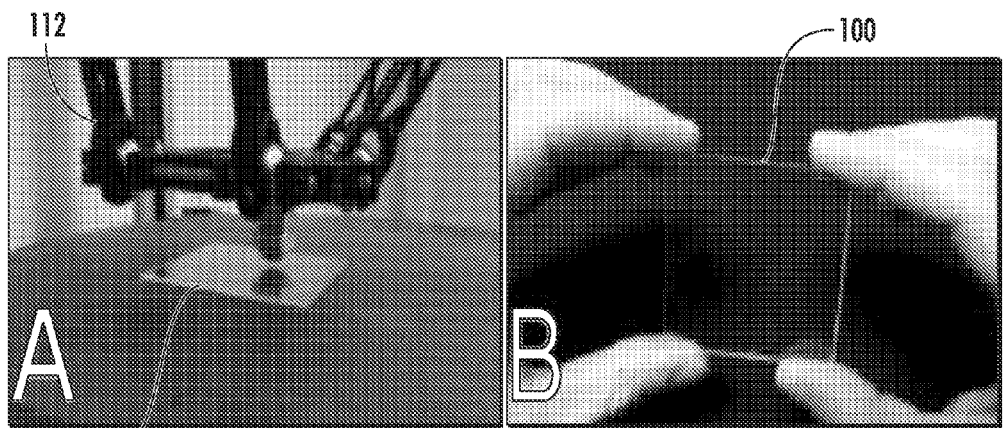
FIGS. 6A-6F illustrate a waveguide based pinlight array.
Figures 6C, 6D:
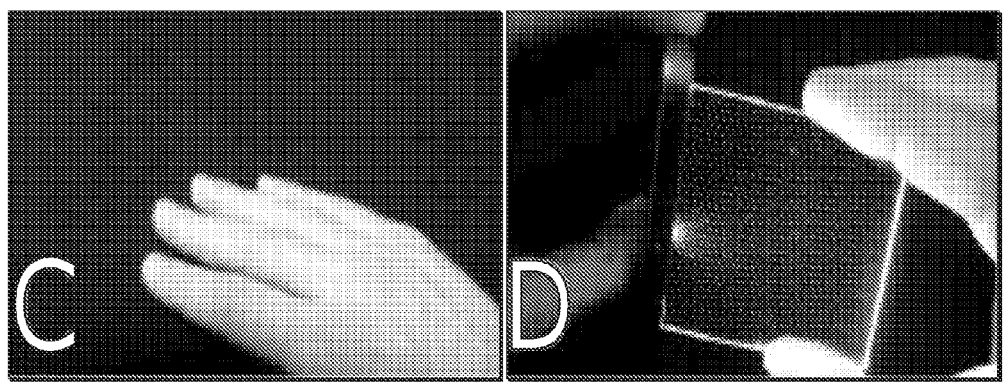
Figure 6E:
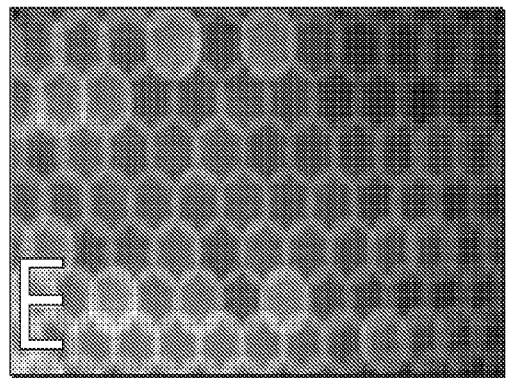

More particularly, as illustrated in FIG. 6A, a backlight layer 100 is formed by creating small divots on an acryllic sheet using a needle attached to a robotic arm 112. FIG. 6B illustrates backlight layer 100 with an array of visible divots when viewed at the focal distance of a human eye. As illustrated in FIG. 6C, when viewed with a camera with an aperture and focus similar to the human eye, the divots appear imperceptible and see-through. As illustrated in FIG. 6D, when viewed from the side and illuminated with a light source, bright spots appear on the waveguide. In FIG. 6E, when the bright spots are defocused near the camera, the pinlights form discs that tile.

Figure 6F:
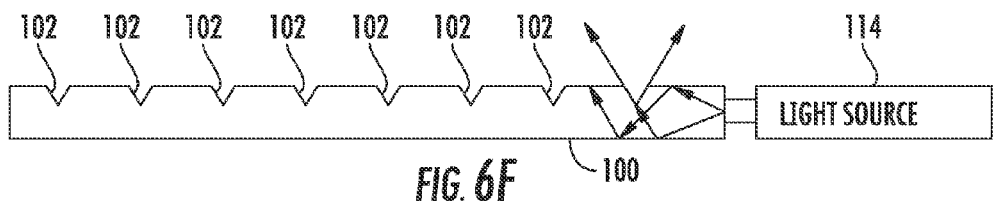

FIG. 6F is a side view of backlight layer 100. In FIG. 6F, light from a light source 114 enters backlight layer 100 through an edge of backlight layer 100. Because of total internal reflection, light rays from the light source do not exit backlight layer 100 from the front face except through divots 102. As stated above, divots 102 may be spaced from each other with an inter-divot spacing of about the same size as the human eye aperture (e.g., about 3 mm).

Note other possibilities for creating an array of transparent light sources: transparent emissive displays (e.g. transparent OLEDs), LED or laser chips mounted on a transparent conductive substrate (e.g. ITO coated glass), fiber optics, holograms, and quantum dots.

3.4.2 Modulating Light Sources

An SLM intended for a pinlight projector display must work in a transmissive mode and should have high transmittance, a wide viewing angle, high contrast, and should minimally diffract light. In our implementation, we selected an LCD microdisplay with high transmissivity and pixel density. To minimize the diffraction and light loss through the display caused by color filters, a monochrome panel may be used and operated in conjunction with a color sequential pinlight array. Hardware implementation details are described in Section 4.1.

3.4.3 Optimizing See-Through Capability

Figure 10C:
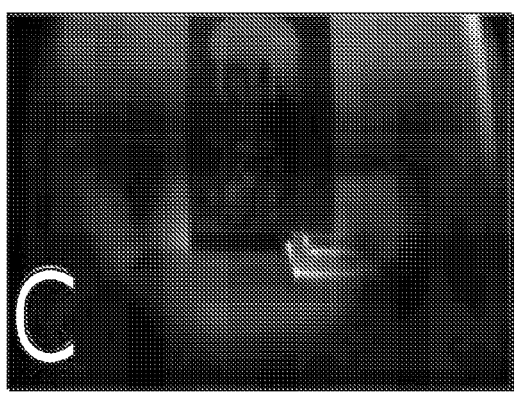
Figure 10D:
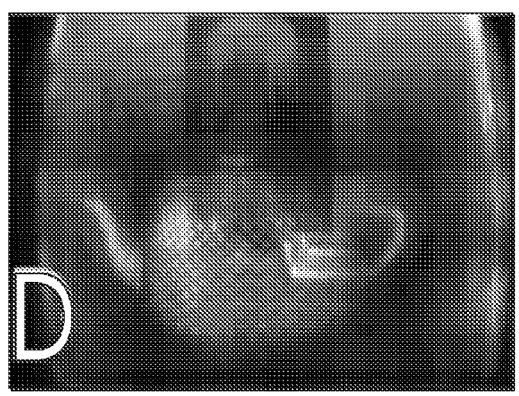
Figure 10E:

To achieve a see-through capability, it is assumed that the SLM and pinlight array are effectively transparent when defocused near the eye. Note, however, two complicating factors. First, light from the environment may permeate the SLM in addition to illumination from the pinlights, causing a soft defocused glow around the synthetic image (see FIG. 10C). Second, light from the environment only reaches the eye through the defocused mask on the SLM, causing a soft, uneven coloring of the environment and allowing little light to reach the eye in areas where there are no synthetic objects (see FIG. 10D). To mitigate these issues, we may rapidly alternate between displaying an augmented image with the pinlights on (see FIG. 10D), and displaying a occlusion mask of the augmented image with the pinlights off (which appears defocused, see FIG. 11D). This allows light from the environment to reach parts of the display where no augmented imagery is shown and reduces the apparent soft glow around the augmented images (see FIG. 10E).

3.4.4 Creating Modulation Masks

Figure 11A:
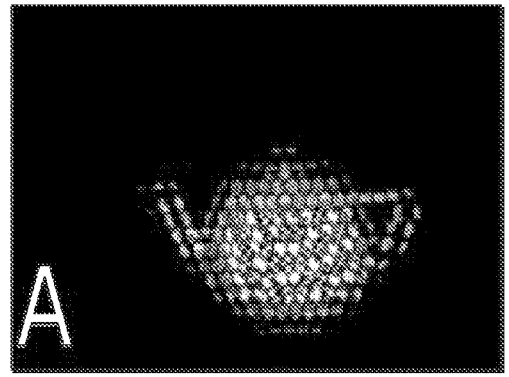
FIGS. 11A-11F illustrate sample display inputs and results. The inset images show magnified regions.
Figure 11B:
Figure 11C:
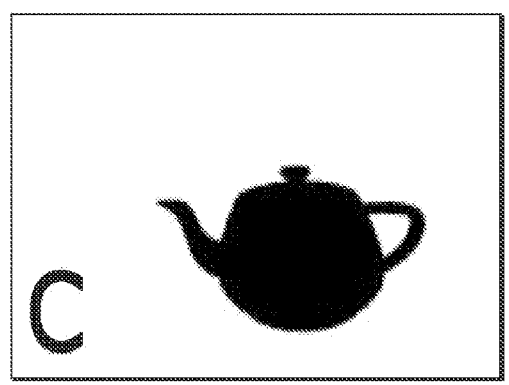
Figure 11D:
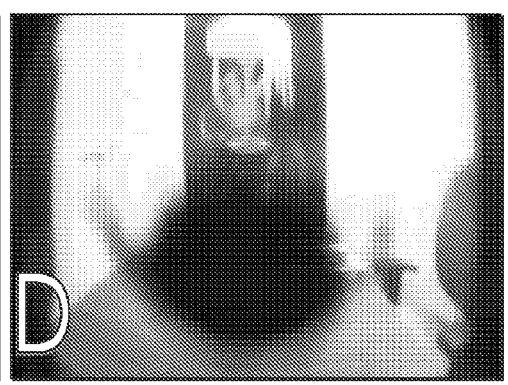
Figure 11E:
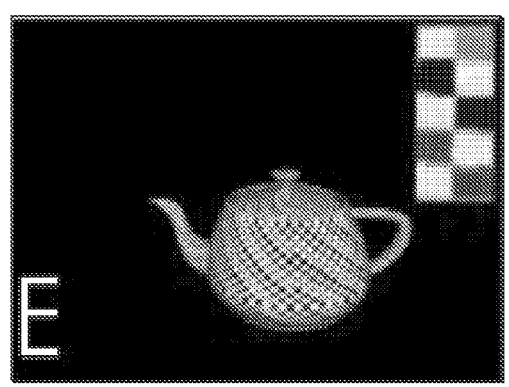
Figure 11F:
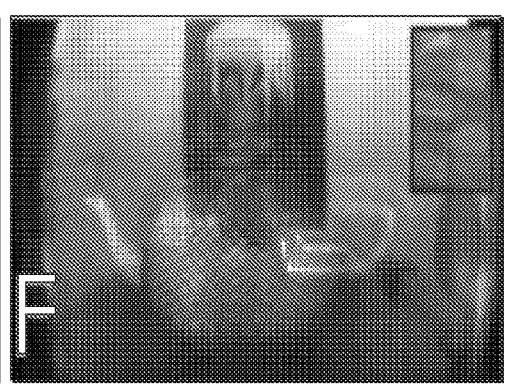

To create the modulation masks to display on the SLM, the virtual scene is projected through the pinlights onto the modulation layer with respect to the eye. We implement this process in software by rendering the virtual scene with a camera that uses an off-axis projection frustum defined by the eye and each pinlight; this process is repeated for each pinlight. If the scene is a simple 2D plane at the eye focus distance (rather than an arbitrary light field), this process is performed more efficiently by finding the intersection of the camera frustum and the focus plane and transferring a flipped and appropriately scaled copy of the image region onto the correct region of the modulation plane. For images representing occlusion masks, we simply draw an unmodified copy of the image on the modulation plane, which appears defocused when viewed. Example modulation and occlusion masks are shown in FIGS. 11A and 11C.

3.4.5 Changes in Eye State

Although accommodating the display for eye movement was discussed in Section 3.3, the eye may change in other ways that may affect the display; notably the pupil size or focal state may change.

Handling Change in Pupil Size

In the tracked configuration (Section 3.3.1), we assumed that the eye aperture size was fixed in Equation 6. We can account for a dynamic aperture size using one of four methods. First, the display geometry can be configured for the maximum allowable aperture size and a virtual aperture (see Section 3.3.1) can be created with the minimum allowable size. This allows only a smaller central area of the pupil to receive light as the pupil size changes, but will cause a resolution loss proportional to the ratio of the largest and smallest apertures. Second, the display could be configured with a small eyebox sufficient to allow the pupil size to expand beyond a minimum size. This approach also results in a similar loss in resolution but the additional of a small eyebox also helps compensate for tracker error and latency. Third, the display could be outfitted with a dynamic pinlight array (e.g. a transparent OLED display) that can adjust the spacing of the pinlights according to tracked pupil sizes. Finally, the amount of light reaching the eyes could be controlled in an active loop by the SLM and/or pinlight array in an attempt to control pupil size to a predetermined size. The display could also simply be set sufficiently bright to force the pupils to contract to near their minimum size. However, note other factors than lighting may affect pupil size. In the untracked configuration (Section 3.3.2), variable aperture sizes are already considered in Equation 9.

Eye Focus

In a tiled pinlight projector display, changes from the expected eye focus do not cause the image to become appreciably "blurred", but rather change the scaling of the tiled sub-images among the various projectors so that they expand or contract, causing tile gaps or overlaps to occur in some cases. This is expected to appear less natural to the user than normal focal blur. However, the change in scaling is small unless the viewer is focused at very close range; e.g. the change in scaling from a distance of 1 m to infinity is ≤3% in a typical display (see Equation 6). Gaps caused by nearer than expected focus can be avoided by configuring the pinlight projectors so that they slightly overlap.

4 Implementation

4.1 Hardware

To test our design experimentally, we created a prototype device that operates in the "tracked" configuration (see Section 3.3.1), but with the use of a camera in a known location rather than a human eye. Our prototype device consists of two main optical components: LCDs (Sony LCX017, 36.9×27.6 mm active area, 1024×768 pixels, 705 dpi, 60 Hz, monochrome) and a waveguide pinlight array that was constructed as described in Section 3.4.1 (1 mm thick, 1.8 mm horizontal pinlight pitch) with RGB LED color sequential illumination. The modulation plane and pinlight plane were spaced at a distance of $d_p - d_m = 13.5$ mm, creating an optical assembly with a total thickness of 15.5 mm including component thickness and 10.5 mm of empty space. The components were mounted in a 3D printed plastic eyeglasses frame. See photos in FIG. 1B and FIG. 7. The bulky components on the far left and right of the glasses house an LCD adapter board that can be removed in a future device.

Figure 7:
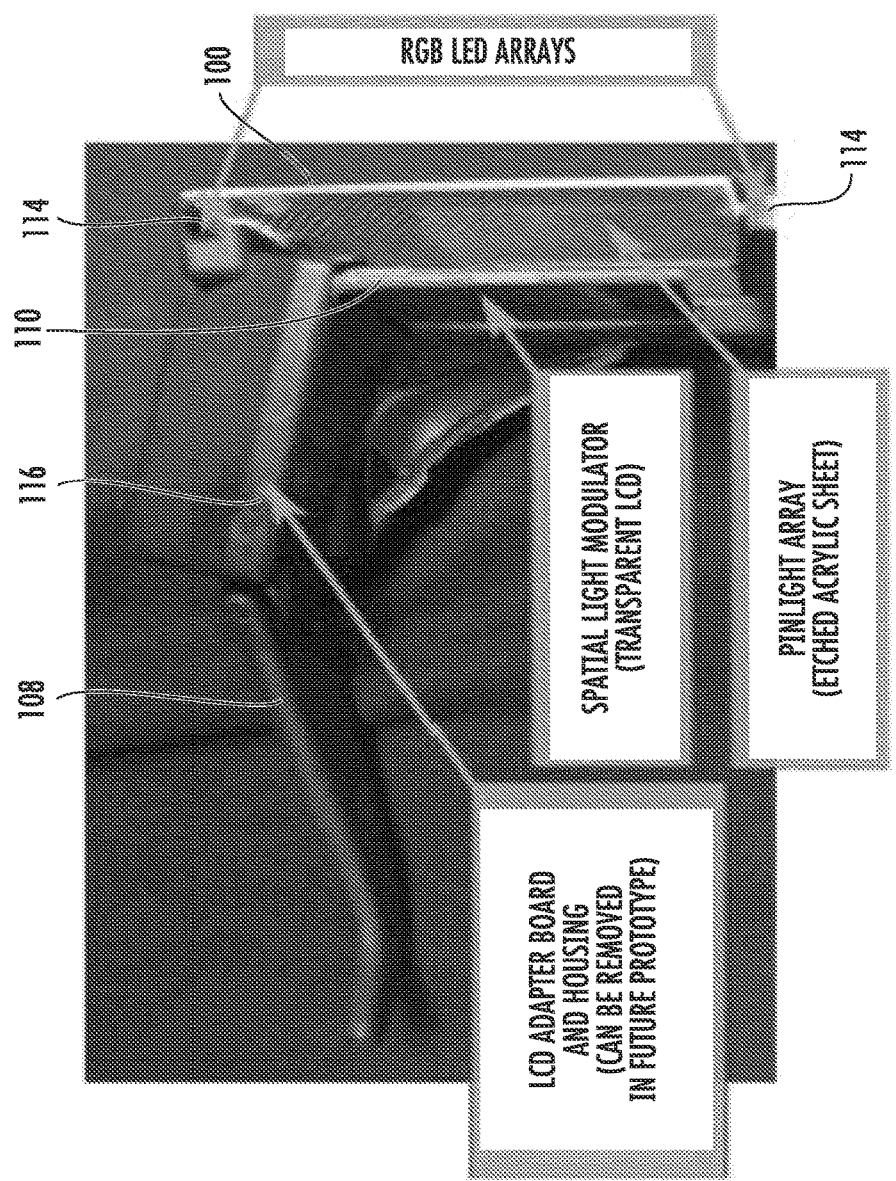
FIG. 7 is a top view of a portion of the prototype display illustrated in FIG. 1B illustrating components of the display.

In FIG. 7, backlight layer 100 is mounted to eyeglasses frame 108. Light sources 114 comprise red, green, and blue (RGB) LED arrays. Spatial light modulator 110 is mounted optically in front of backlight layer 100 and in the illustrated example comprises a transparent LCD. An adaptor board 116 and housing provides an electrical interface to the LCD panel.

Figure 8:
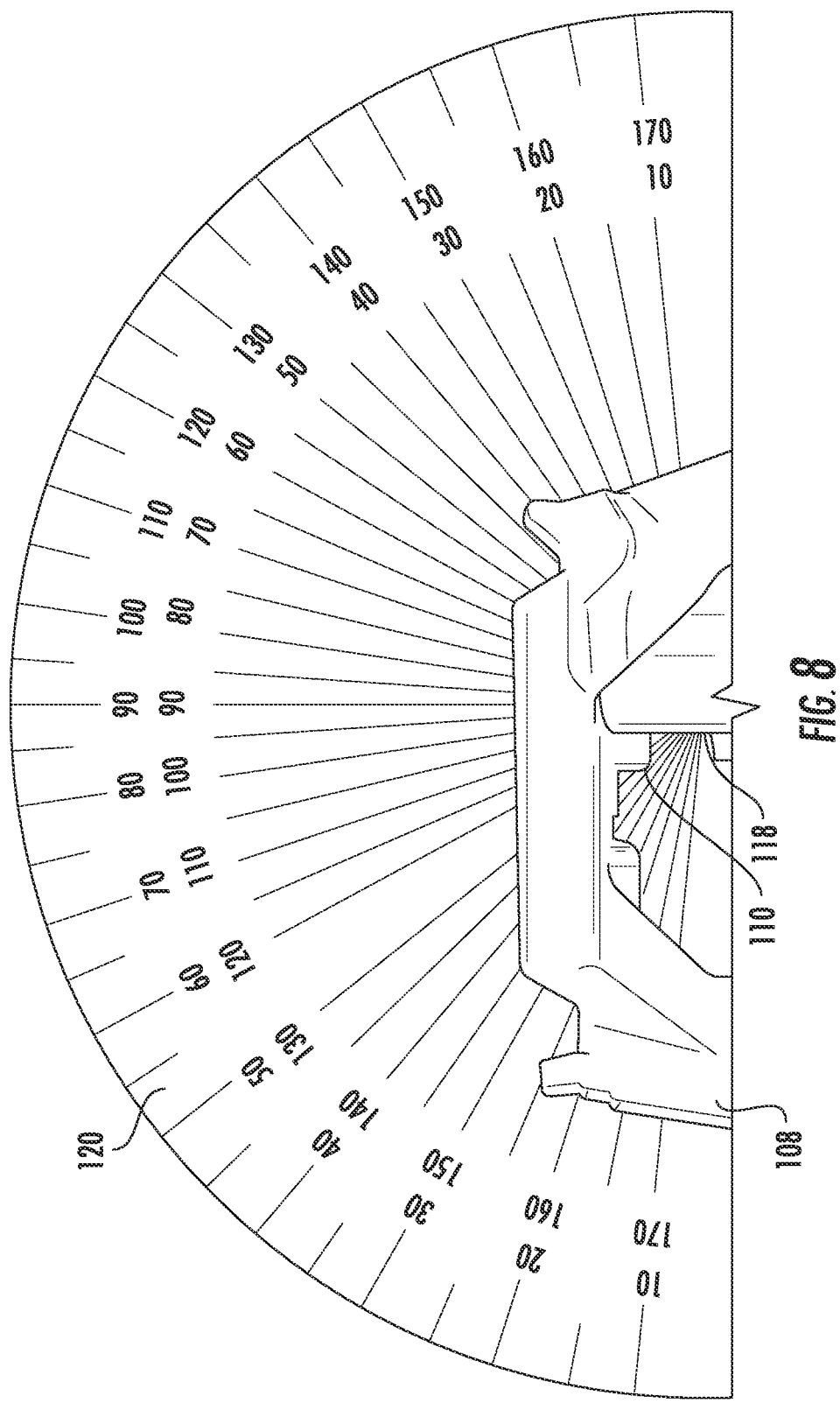
FIG. 8 is a top view illustrating the prototype display and a protractor depicting camera mounting and display measurement. A camera is mounted behind the display prototype that approximates a human viewer wearing eye glasses. A protractor is placed with the origin at the camera center of projection to measure field of view. An image taken through the camera is depicted in FIG. 1B.

The display was tested using a camera that approximated a human eye (PointGrey Flea2 camera body with a Fujinon F1.2, 2.3 mm aperture lens). The camera was mounted behind the display (see FIG. 8) at a distance that approximated a human wearing eyeglasses (i.e. a camera center of projection to modulation plane distance of $d_m = 16$ mm). More particularly, in FIG. 8, camera 118 is mounted on the right-hand side of eyeglasses frame 108 behind its respective spatial light modulator 110. An image taken through camera 118 is shown in FIG. 1D. We did not implement eye tracking, but assumed the camera was in a known position behind the display. The field of view of the display through the camera is 110° diagonally, limited by the camera's field of view and a cropping of the top of the camera image to remove portions of the LCD with poor viewing angles. The FOV was measured by placing a protractor 120 at the camera's center of projection as shown in FIGS. 8 and 1D.

An Arduino microcontroller board and transistor circuit were used to drive the RGB LEDs in a color sequential mode that was synchronized to the monochrome display. A occlusion mask sub-frame was also included to improve the see-through ability (see Section 3.4.3). The LCD panels were controlled by an externally housed driver board connected by a DVI link to an Intel Core i7 PC with an NVIDIA GTX 580 GPU running Linux.

4.2 Software

Real-time tiled imagery for the prototype display was generated with an OpenGL/GL Shader Language based program using the fast image transfer method described in Section 3.4.4. Computation times for generating the tiled images given the target image were 1-2 ms per frame. The program also decomposed the image into color channels for color sequential operation and adjusted the image to compensate for poor LCD contrast at wide angles. Simulated images were generated by drawing the modulation plane image and a grid of pinlight dots at their apparent positions with respect to a virtual camera placed at the eye position. Images were summed over a densely sampled set of positions over a round camera aperture that matched the diameter of the intended viewer.

5 Experimental Assessment 5.1 Simulated Results

To evaluate the theoretical performance of the proposed display design, we simulated various tiled pinlight projector configurations as described in Section 4.2 with a modulation plane that matched the specifications of our prototype LCD panel (see Section 4.1).

The following configurations were tested: (1) a tracked virtual aperture configuration of $d_p=29$ mm and $d_m=15$ mm, (2) an untracked, small eyebox configuration of $d_p=22.8$ mm, $d_m=15$ mm, and $a_{e_b}=5$ mm, and (3) a untracked larger eyebox configuration of $d_p=18.6$ mm, $d_m=15$ mm, and $a_{e_b}=11$ mm. All configurations were simulated with an eye pupil size of $a_e=3$ mm focused at a distance of $d_f=\infty$. Note that the tracked configuration is similar to that used by our prototype display. The untracked, small eyebox configuration provides a miniature eyebox of $a_{e_b}-a_e=2$ mm that could be used to compensate for tracker error and latency and pupil size variation.

Figure 9:
FIG. 9 illustrates display simulations. The inset images of the word "field" illustrate magnified regions. The top left portion of FIG. 9 illustrates a reference image, used as a target image for simulation. The top right image in FIG. 9 illustrates the tracked configuration simulation. The bottom left image in FIG. 9 illustrates the untracked configuration simulation (small eyebox). The bottom right image in FIG. 9 illustrates the untracked configuration (larger eyebox)
Figure 12A:
FIGS. 12A-12D illustrate sample results from the prototype illustrated in FIG. 1B.
Figure 12B:
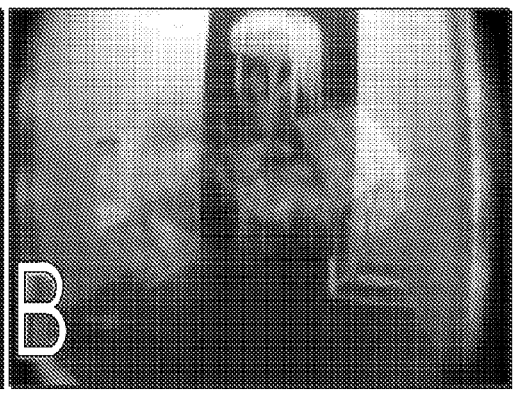
Figure 12C:
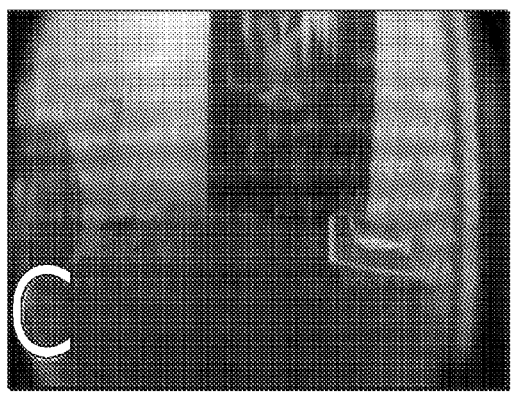
Figure 12D:
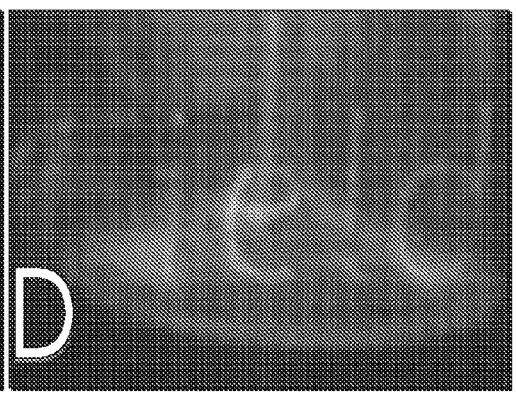

Results are shown in FIG. 9. More particularly, in FIG. 9, the inset images of the word "field" show magnified regions of the display. The top left image in FIG. 9 is a reference image used as a target for simulation. The top right image in FIG. 9 is a tracked configuration simulation. The bottom left image in FIG. 9 illustrates an untracked configuration simulation (small eyebox). The bottom right image in FIG. 9 illustrates results for an untracked configuration (large eyebox). The tracked virtual aperture simulation may be compared to the result achieved on our prototype display in FIGS. 12C and 12D. More particularly, FIGS. 12A-12D illustrate example images taken through the prototype display illustrated in FIG. 1B. FIG. 12A illustrates a user interacting with a virtual teapot. FIG. 12B illustrates a virtual image of a Darth Vader's tie fighter superimposed on the image of a room. FIG. 12C is an image of text displayed to fill the entire field of view. FIG. 12D is a magnified region of the image from FIG. 12C which represents a horizontal field of view of approximately 12°.

5.2 Prototype Display Results

To evaluate real-world performance, we also tested our tiled pinlight projector design using a hardware prototype with a camera placed behind the display. The hardware prototype was configured in the tracked virtual aperture configuration (see Section 3.3.1) with the assumption that the eye position was known using a camera placed in a fixed position. See Section 4.1 for full specifications.

FIG. 10 shows the steps of image formation on our prototype. The image begins as overlapping defocused discs (FIG. 10A) from the pinlight array which are converted to a plane of abutting hexagonal tiles through the encoding of a virtual aperture on the modulation plane (FIG. 10B). An augmented image is then encoded in the modulation plane, which appears defocused when viewed with unstructured illumination from the scene (FIG. 10C). When illuminated, the strongly directional light from the pinlight array causes a focused augmented image to appear, although the dark regions of the modulation mask cause the background to appear, dark, except for a glowing region around the virtual image (FIG. 10D). When an occlusion mask sub-frame is included with the pinlight array off, the see-through ability is improved (FIG. 10E).

FIG. 11 shows the inputs to the prototype display and the captured outputs when the display is operated in a color sequential mode with an occlusion mask sub-frame. During each color sub-frame, an encoded image is sent to the display's LCD panel (FIG. 11A), which appears as FIG. 11B when viewed through the display. During each occlusion mask sub-frame, the backlight is disabled and an occlusion image is sent to the LCD (FIG. 11C), which appears defocused through the display (FIG. 11D). The final perceived image is the integration of the color and occlusion mask sub-frames (FIG. 11F), which can be compared to the theoretical performance of the display through simulation (FIG. 11E).

FIG. 12 shows the display generating imagery for a variety of augmented reality scenarios: a gesture based interaction (FIG. 12A), visualization of a detailed model (FIG. 12B), and display of overlaid text (FIG. 12C). Note that FIG. 12C shows the display utilizing its entire field of view of approximately 110° diagonally. FIG. 12D shows a magnified region of FIG. 12C which can be compared to the similar simulated case in FIG. 9 (top right).

6 Additional Details

Figure 13:
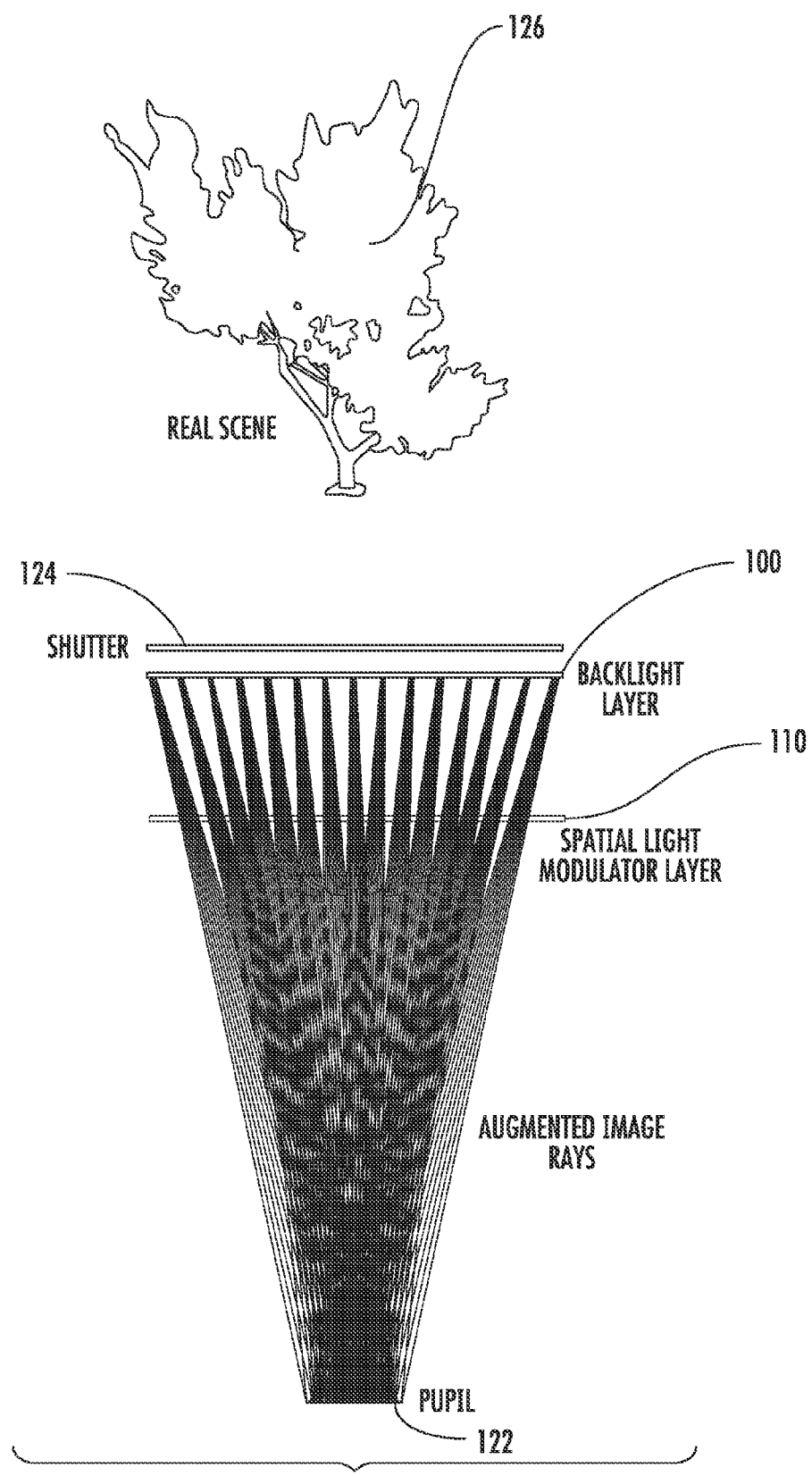
FIG. 13 is a top view of an optical see-through near-eye display according to an embodiment of the subject matter described herein.

FIG. 13 is a schematic diagram of a near-eye see-through display according to an embodiment of the subject matter described herein. Referring to FIG. 13, point light sources (not shown) on backlight layer 100 pass through spatial light modulator 110 where they are modulated as described above to produce augmented image rays which enter the human eye through pupil 122. An optional shutter 124 may be located behind backlight layer 100 to allow viewing of real scene 126 during part of a viewing cycle and to view only a virtual image displayed by spatial light modulator 110 during a virtual image display cycle.

As described above, near-eye see-through displays are designed to be worn by the user so that the user can see a synthetic image superimposed over their view of their real environment. Some existing near-eye see-through displays suffer from a narrow field of view limitation inherent in their designs. For example, near-eye see-through displays that relay an image from a small display to the eye through a waveguide are limited to a narrow field of view. When limited to a narrow field of view, spatially aligning synthetic objects to real objects is ineffective, as the narrow superimposed region changes as the user's head moves.

The subject matter described herein includes a near-eye optical see-through display that uses an array of point light sources located behind a spatial light modulator (SLM) to display an in focus image with a wide field of view at the pupil location. The geometry of the display shown in the attached drawing is such that each pixel on the SLM is illuminated by light emanating from only a single point light source. As a result, the display forms a distant, in focus image to the user, although the display components are placed closer than the eyes can focus.

In some embodiments, the point light sources can be LEDs or OLEDs. In an alternate implementation (described above), the point light sources may be bright spots formed by creating scattering or light redirecting features on the surface of an illuminated waveguide. For example, backlight layer 100 illustrated in FIG. 13 may include one or more light sources that illuminate the edge(s) of a waveguide. The waveguide may include etched features that appear as point light sources that illuminate the SLM layer as described above with respect to FIGS. 6A-6F.

Figure 14:
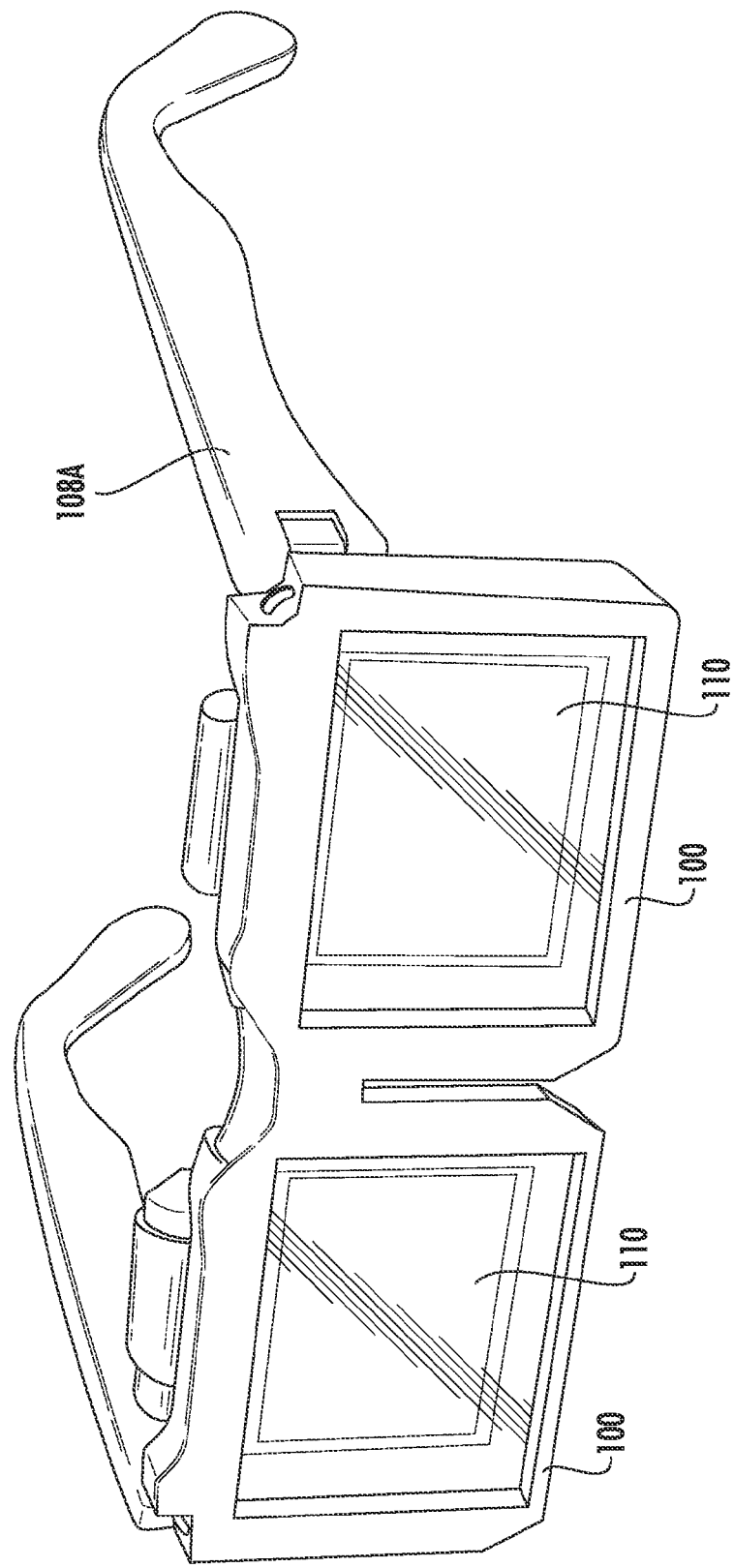
FIG. 14 is a perspective view of another prototype of an optical see-through near-eye display according to an embodiment of the subject matter described herein.

As stated above, a near-eye see-through display according to an embodiment of the subject matter described herein includes a compact form factor and yields a wide field of view. FIG. 14 illustrates another prototype of a near-eye see-through display according to an embodiment of the subject matter described herein. Referring to FIG. 14, the display includes an eyeglasses frame 108A. Backlight layers 100 are mounted in each eye frame. Spatial light modulators 110 are mounted behind each backlight layer 100. Shutter 124 is omitted as shutter 124 is an optional feature.

Figure 15:
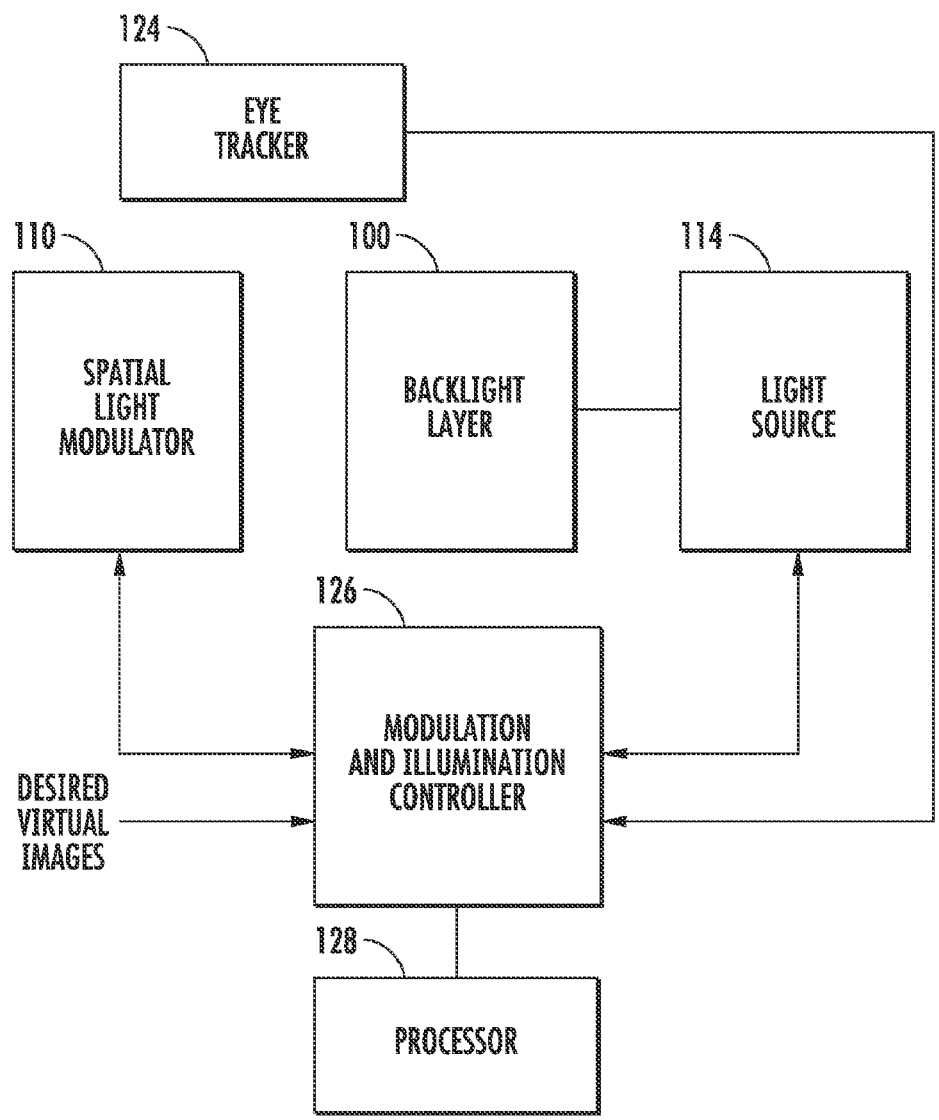
FIG. 15 is a block diagram illustrating exemplary components of an optical see-through near-eye display according to an embodiment of the subject matter described herein.

FIG. 15 is a block diagram illustrating an exemplary system for displaying virtual images on a near-eye see-through display according to an embodiment of the subject matter described herein. Referring to FIG. 15, the system includes a backlight layer 100, a spatial light modulator 110, and a light source 114 as described above. In addition, if eye-tracking is implemented, the system may include an eye tracker 124 that tracks movements of the user's eyes. Eye tracker 124 may be a camera or other type of optical sensor capable of tracking pupil size changes and movements. A modulation and illumination controller 126 controls spatial light modulator 110 and light source 114 so that desired virtual images are displayed in the user's field of view. Modulation and illumination controller 126 may be implemented in software executed by a processor 128. Alternatively, modulation and illumination controller 126 may be a hardware or firmware component.

As stated above, the displays described herein are capable of tiling light emanting from the pinlight projectors to achieve an arbtrarily wide field of view. In one embodiment, light emanating from the pinlight projectors can be tiled to produce a field of view of 60° or greater, in contrast with conventional near-eye displays that only achieve a field of view of less than 60° for synthetic images. While the subject matter described herein is capable of displaying synthetic images across a wider field of view than existing display systems, the light emanating from the pinlight displays can also be tiled to achieve fields of view narrower than 60° without requiring the complex optics of existing systems.

Figure 16:
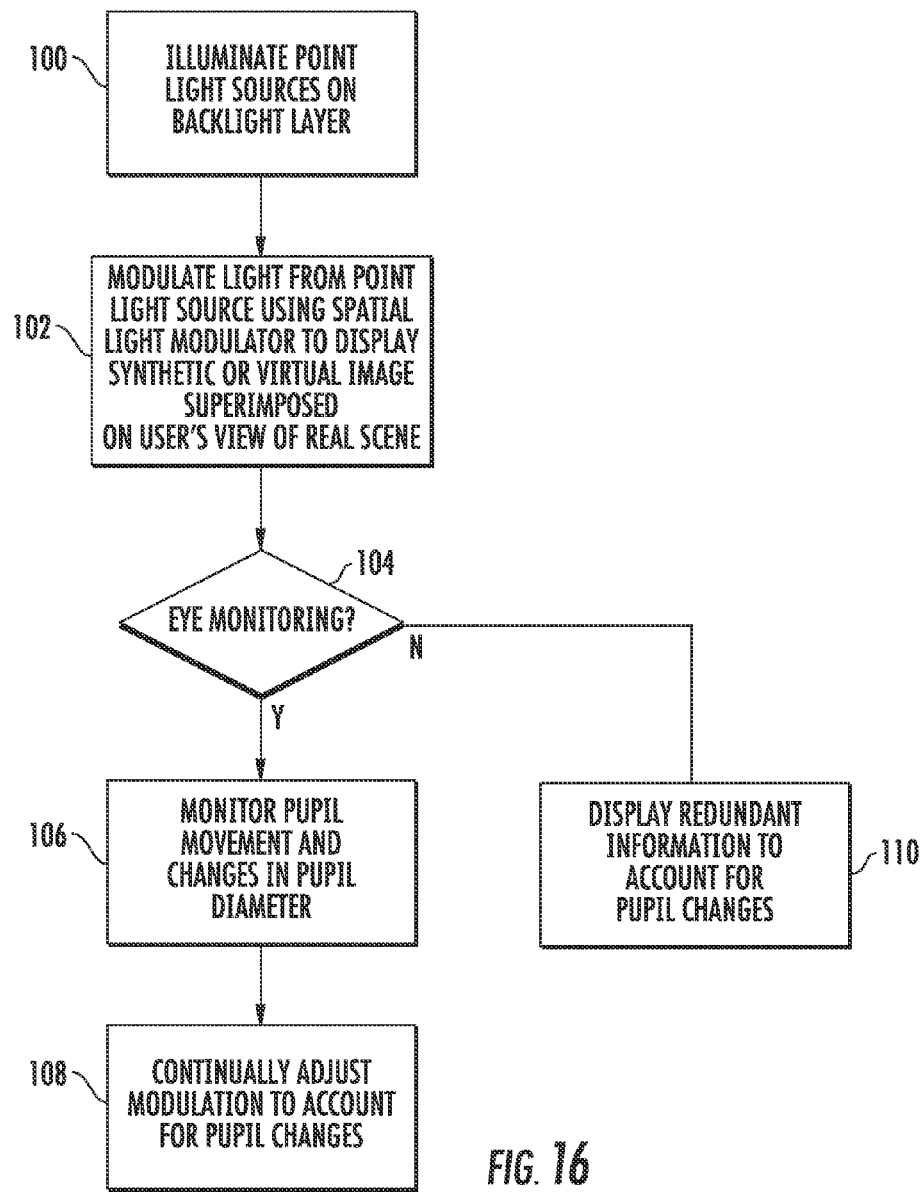
FIG. 16 is a flow chart illustrating an exemplary process for controlling an optical see-through near-eye display according to an embodiment of the subject matter described herein.

FIG. 16 is a flow chart illustrating an exemplary process for displaying virtual images on a near-eye see-through display according to an embodiment of the subject matter described herein. Referring to FIG. 16, in step 100, point light sources on a backlight layer are illuminated. For example, point light sources on an acryllic sheet may be illuminated from edge mounted light sources. Alternatively, a see-through LED display may be used to implement the point light sources. In step 102, light from the point light sources is modulated using a spatial light modulator to display a synthetic or virtual image superimposed on the user's view of a real scene. The modulation may be performed as described above such that a desired object being displayed is tiled to fill the field of view of the user.

In step 104, if eye monitoring is implemented, control proceeds to step 106 where pupil movement and changes in pupil diameter are monitored. In step 108, the modulation is continually adjusted to account for pupil changes. Monitoring eye movement and pupil diameter changes and adjusting the displayed images to account for these changes is described above with respect to FIG. 3.

If eye monitoring is not implemented, redundant information is displayed to account for pupil changes, as indicated by block 110. Displaying redundant information could account for pupil changes is described above with respect to FIG. 5.

The disclosure of each of the following references is hereby incorporated herein by reference in its entirety.

REFERENCES

BENOÎT-PASANAU, C., GOUDAIL, F., CHAVEL, P., CATO, J.-P., AND BALLET, J. 2010. Minimization of diffraction peaks of spatial light modulators using Voronoi diagrams. *Opt. Express* 18, 14, 15223-15235.

BROWN, M., MAJUMDER, A., AND YANG, R. 2005. Camera-based calibration techniques for seamless multiprojector displays. *Visualization and Computer Graphics, IEEE Transactions on* 11, 2 (March), 193-206.

CAKMAKCI, O., THOMPSON, K., VALLEE, P., COTE, J., AND ROLLAND, J. P. 2010. Design of a free-form single-element head-worn display. *Proc. SPIE* 7618, *Emerging Liquid Crystal Technologies V,* 761803-761803-6.

CHAING, H.-C., HO, T.-Y., AND SHEU, C.-R., 2005. Structure for reducing the diffraction effect in periodic electrode arrangements and liquid crystal device including the same. U.S. Pat. No. 6,977,705.

CHENG, D., WANG, Y., HUA, H., AND SASIAN, J. 2011. Design of a wide-angle, lightweight head-mounted display using free-form optics tiling. *Opt. Lett.* 36, 11 (June), 2098-2100.

HAGOOD, N., BARTON, R., BROSNIHAN, T., FIJOL, J., GANDHI, J., HALFMAN, M., PAYNE, R., AND STEYN, J. L. 2007. 35.5I: Late-news paper: A direct-view mems display for mobile applications. *SID Symposium Digest of Technical Papers* 38, 1, 1278-1281.

HIURA, S., MOHAN, A., AND RASKAR, R. 2010. Krill-eye: Superposition compound eye for wide-angle imaging via grin lenses. *IPSJ Transactions on Computer Vision and Applications,* 186-199.

JURIK, J., JONES, A., BOLAS, M., AND DEBEVEC, P. 2011. Prototyping a light field display involving direct observation of a video projector array. *In IEEE International Workshop on Projector-Camera Systems (PROCAMS).*

KRESS, B., AND STARNER, T. 2013. A review of head-mounted displays (HMD) technologies and applications for consumer electronics. In *Proc. SPIE,* vol. 8720.

LANMAN, D., AND LUEBKE, D. 2013. Near-eye light field displays. *ACM Trans. Graph.* 32, 6 (November), 220: 1-220:10.

LEVOLA, T. 2006. Diffractive optics for virtual displays. In *Journal of the Society for Information Display.*

MAIMONE, A., AND FUCHS, H. 2013. Computational augmented reality eyeglasses. In *Mixed and Augmented Reality (ISMAR)*, 2013 *IEEE International Symposium on*, 29-38.

MOHAN, A., WOO, G., HIURA, S., SMITHWICK, Q., AND RASKAR, R. 2009. Bokode: Imperceptible visual tags for camera based interaction from a distance. In *ACM SIGGRAPH* 2009 *Papers*, ACM, New York, N.Y., USA, SIGGRAPH '09, 98:1-98:8.

PAMPLONA, V. F., MOHAN, A., OLIVEIRA, M. M., AND RASKAR, R. 2010. Netra: Interactive display for estimating refractive errors and focal range. In *ACM SIGGRAPH* 2010 *Papers*, ACM, New York, N.Y., USA, SIGGRAPH '10, 77:1-77:8.

PAMPLONA, V. F., PASSOS, E. B., ZIZKA, J., OLIVEIRA, M. M., LAWSON, E., CLUA, E., AND RASKAR, R. 2011. Catra: Interactive measuring and modeling of cataracts. In *ACM SIGGRAPH* 2011 *Papers*, ACM, New York, N.Y., USA, SIGGRAPH '11, 47:1-47:8.

SON, J.-Y., SAVELJEV, V. V., KIM, D.-S., KWON, Y.-M., AND KIM, S.-H. 2007. Three-dimensional imaging system based on a light-emitting diode array. *Optical Engineering* 46, 10, 103205-103205-4.

ŚWIRSKI, L., BULLING, A., AND DODGSON, N. A. 2012. Robust real-time pupil tracking in highly off-axis images. In *Proceedings of ETRA*.

TRAVIS, A., LARGE, T., EMERTON, N., AND BATHICHE, S. 2013. Wedge optics in flat panel displays. *Proceedings of the IEEE* 101, 1, 45-60.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A near-eye optical see-through display comprising:
a backlight layer including a plurality of point light sources, wherein the backlight layer comprises a sheet patterned with a sparse array of divots that scatter light through the divots but not between the divots when the sheet is lit from an edge of the sheet to form the point light sources; and
a spatial light modulator (SLM) layer for modulating light from the point light sources, the spatial light modulator layer being located in an optical path between the point light sources and a viewing location at which a user's eye is located during use, the spatial light modulator layer including pixels that are controllable to modulate the light from the point light sources such that the light from the point light sources that arrives at the viewing location has a desired intensity and color to display a synthetic image at the viewing location, wherein at least a portion of the backlight layer and at least a portion of the SLM layer are optically transparent to allow a user to view a real scene through the SLM layer and the backlight layer such that the synthetic image appears to be overlaid on a view of real scene, and wherein each pixel in the SLM layer modulates only a portion of the light emanating from the point light sources and arriving at the viewing location such that the synthetic image appears to be in focus when viewed from the viewing location.

2. The display of claim 1 wherein the sheet comprises a waveguide and the divots are etched in the sheet for scattering or redirecting light from the edge of the sheet.

3. The display of claim 1 comprising a shutter located on a scene side of the backlight layer, the shutter being controllable to be closed during a display phase in which the synthetic image is displayed on the backlight layer and open during a see-through phase in which the synthetic image is not displayed on the backlight layer.

4. The display of claim 2 wherein the pixels on the SLM layer are controllable to allow rapid alternation between the display and see-through phases so that the synthetic image will appear to be overlaid on the real scene.

5. The display of claim 1 wherein the SLM layer comprises a liquid crystal display (LCD).

6. The display of claim 1 wherein the SLM layer is spaced from the point light sources such that each pixel on the SLM layer seen over the area of a pupil of the user's eye is illuminated by only a single light source.

7. The display of claim 1 comprising an eyeglasses frame, wherein the backlight layer and the SLM layer are mounted to the eyeglasses frame.

8. The display of claim 1 wherein the features form a two-dimensional array of the point light sources that are spaced from each other by a distance that is based on the size of an aperture of a human eye.

9. The display of claim 1 wherein the features are configured to create a tiled display of the synthetic image across a desired field of view of the user.

10. The display of claim 9 wherein the desired field of view is at least about 60°.

11. The near-eye see-through display of claim 1 comprising:
an eye monitor for tracking changes in eye position and pupil aperture size; and
an illumination and modulation controller for adjusting at least one of the spatial light modulator or illumination of the backlight layer based on the changes in eye position or pupil aperture size.

12. The display of claim 1 comprising an illumination and modulation controller configured to control the spatial light modulator and/or illumination of the backlight layer to display redundant information to account for changes in a viewer's eye.

13. The display of claim 1 wherein the spatial light modulator is configured to rotate the synthetic image to account for rotation performed by a user's eye.

14. A near-eye optical see-through display comprising:
a display frame for mounting the display near a user's eye;
a backlight layer mounted to the display frame and including a two-dimensional array of point light sources, wherein the backlight layer comprises a sheet patterned with a sparse array of divots that scatter light through the divots but not between the divots when the sheet is lit from an edge of the sheet to form the point light sources;
a spatial light modulator layer mounted to the display frame and for modulating light from the point light sources, the spatial light modulator being located in an optical path between the point light sources and a viewing location at which a user's eye is located during use, the spatial light modulator layer being controllable to modulate the light from the point light sources to display a synthetic image overlaid on a view of a real scene at the viewing location; and
a modulation and illumination controller for controlling illumination of the backlight layer and modulation performed by the spatial light modulator.

15. The display of claim 14 comprising a sensor for sensing changes in pupil position or size and wherein the modulation and illumination controller is configured to adjust display of the synthetic image based on the changes in pupil position and size.

16. The display of claim 14 wherein the modulation and illumination controller is configured to display redundant information of the synthetic image to account for changes in pupil size and position.

17. The display of claim 14 wherein the modulation and illumination controller is configured to control the spatial light modulator to tile light emanating from the point light sources to produce the synthetic image across the horizontal field of view.

18. The display of claim 14 wherein the sheet comprises a waveguide.

19. The display of claim 14 wherein the point light sources and the spatial light modulator are configured so that each point in the synthetic image reproduced by two or more modulated rays emitted by the spatial light modulator simultaneously enter a pupil of the user's eye so that the user receives focal depth cues.

* * * * *